United States Patent
Shimoda et al.

(10) Patent No.: US 8,823,844 B2
(45) Date of Patent: Sep. 2, 2014

(54) IMAGING DEVICE AND IMAGING APPARATUS

(75) Inventors: Kazuhito Shimoda, Kyoto (JP); Shinichi Fujii, Kanagawa (JP)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 13/399,277

(22) Filed: Feb. 17, 2012

(65) Prior Publication Data

US 2012/0224096 A1 Sep. 6, 2012

(30) Foreign Application Priority Data

Mar. 2, 2011 (JP) ................ P2011-044578

(51) Int. Cl.
*G03B 13/00* (2006.01)
*H04N 5/232* (2006.01)
*G02B 19/00* (2006.01)
*G02B 7/36* (2006.01)
*G03B 13/36* (2006.01)

(52) U.S. Cl.
CPC ........ *H04N 5/23212* (2013.01); *G02B 19/0076* (2013.01); *G02B 7/36* (2013.01); *G03B 13/36* (2013.01)
USPC .......................................... 348/249; 348/350

(58) Field of Classification Search
CPC .................................................. H04N 5/23212

USPC .......................................... 348/345, 349, 350
See application file for complete search history.

(56) References Cited

U.S. PATENT DOCUMENTS

| 2005/0275904 A1* | 12/2005 | Kido et al. ..................... 358/461 |
| 2010/0110272 A1* | 5/2010 | Sugawara ..................... 348/341 |
| 2011/0063484 A1 | 3/2011 | Fujii et al. |

FOREIGN PATENT DOCUMENTS

JP 2009-204987 A 9/2009

\* cited by examiner

*Primary Examiner* — Sinh Tran
*Assistant Examiner* — Mark Monk
(74) *Attorney, Agent, or Firm* — Sony Corporation

(57) ABSTRACT

An imaging device includes a micro lens that collects light from a subject, a light sensing element that generates a signal for performing focusing determination through phase difference detection by sensing subject light collected by the micro lens, and a light blocking portion that is disposed between the micro lens and the light sensing element and performs pupil division for the subject light by blocking a part of the subject light, wherein the light blocking portion is set such that a position of an image forming point of subject light passing through the micro lens and a position of an end portion of the light blocking portion on an entrance side become distant from each other according to a variation in image height.

21 Claims, 13 Drawing Sheets

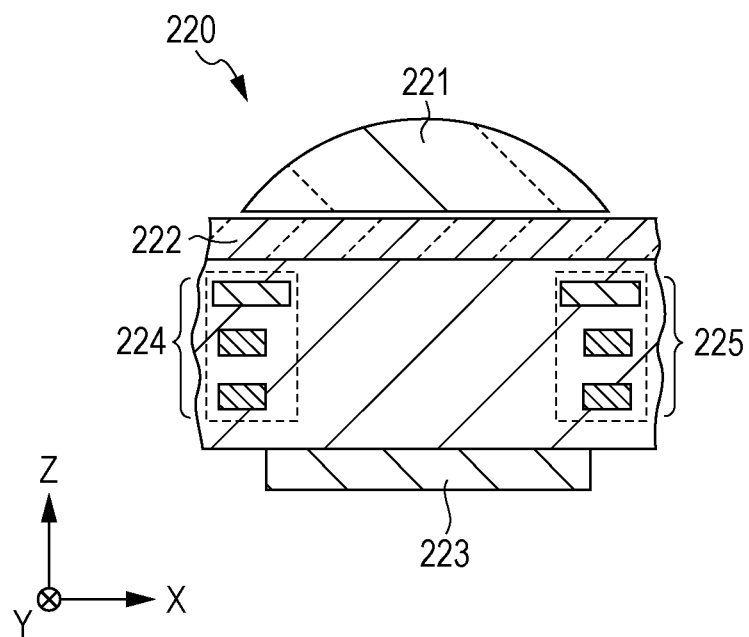
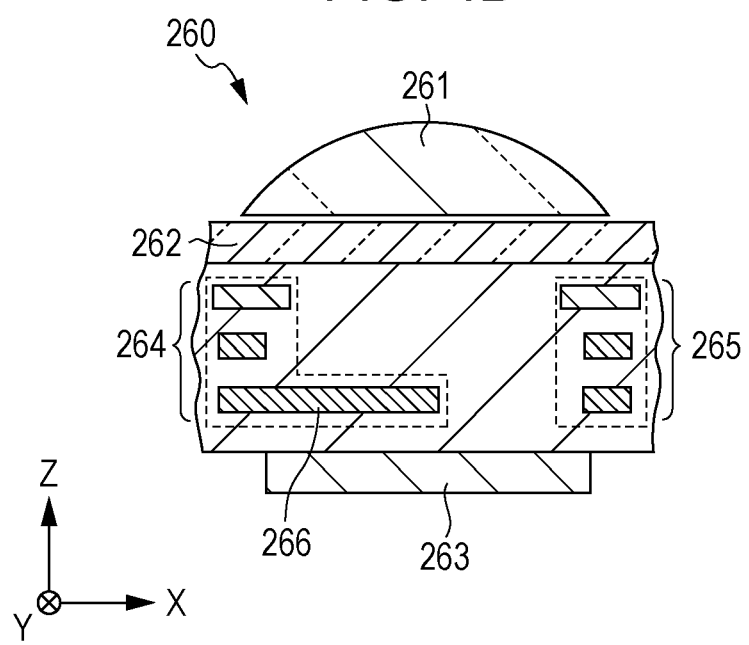

IMAGING DEVICE AND IMAGING APPARATUS

CROSS-REFERENCE TO RELATED APPLICATION

The present application claims priority from Japanese Patent Application No. JP 2011-044578 filed in the Japanese Patent Office on Mar. 2, 2011, the entire content of which is incorporated herein by reference.

BACKGROUND

The present disclosure relates to an imaging device, and more particularly to an imaging device and an imaging apparatus which generate a signal for detecting a phase difference.

In recent years, there has been diffused an imaging apparatus such as a digital still camera which generates a captured image by imaging a subject such as a figure, and records the captured image generated. In addition, as the imaging apparatus, in order to make a photographing operation of a user simple, there has been diffused an imaging apparatus which has an automatic focus (AF) function of automatically performing focus adjustment at the time of imaging.

As the imaging apparatus, there has been proposed an imaging apparatus in which, for example, light passing through an imaging lens is divided through pupil division so as to form a pair of images, and a position of the imaging lens is determined by measuring a gap between the formed images (detecting a phase difference). For example, there has been proposed an imaging apparatus in which both pixels (phase difference detection pixels) used for phase difference detection (focal point detection) which perform pupil division by blocking half of subject light sensed by a light sensing element and pixels for generation of captured images (image generation pixels) are provided in a single imaging device. In a case where the imaging apparatus performs phase difference detection, a pair of images is formed based on a signal from the phase difference detection pixels, and a focus misalignment amount is calculated by measuring a gap between the formed images. Thereafter, the imaging apparatus calculates a movement amount of the imaging lens based on the calculated focus misalignment amount, and performs focusing by adjusting a position of the imaging lens based on the calculated movement amount (focus adjustment).

In addition, for example, there has been proposed an imaging apparatus where a position of a light blocking mask for dividing an exit pupil is set for each phase difference detection pixel such that the exit pupil is equally divided into two (for example, refer to Japanese Unexamined Patent Application Publication No. 2009-204987).

SUMMARY

In the imaging apparatus, the exit pupil is equally divided into two in each phase difference detection pixel, and thus phase difference detection can be performed with high accuracy. However, in the imaging apparatus, there are cases where phase difference detection characteristics of an on-axis phase difference detection pixel may be different from phase difference detection characteristics of an off-axis phase difference detection pixel due to vignetting. Therefore, an imaging device reflecting the influence of the vignetting on the phase difference detection pixels is preferable.

It is desirable to improve the characteristics of a phase difference detection pixel in an imaging device.

According to an embodiment of the present disclosure, there is provided an imaging device including a micro lens that collects light from a subject; a light sensing element that generates a signal for performing focusing determination through phase difference detection by sensing subject light collected by the micro lens; and a light blocking portion that is disposed between the micro lens and the light sensing element and performs pupil division for the subject light by blocking a part of the subject light, wherein the light blocking portion is set such that a position of an image forming point of subject light passing through the micro lens and a position of an end portion of the light blocking portion on an entrance side become distant from each other according to a variation in image height. This leads to an operation in which the light blocking layer for pupil division is set such that a position of an image forming point of subject light passing through the micro lens and a position of an end portion of the light blocking portion on an entrance side become distant from each other according to a variation in image height in a phase difference detection pixel.

In the embodiment, a micro lens, a light sensing element, and a light blocking portion may constitute a phase difference detection pixel, and two phase difference detection pixels adjacent or close to each other may be used as a pair of phase difference detection pixels for performing the phase difference detection. In relation to a centroid position in an exit pupil of light sensed by one phase difference detection pixel of the pair of phase difference detection pixels, positions from the center of the exit pupil in the one phase difference detection pixel may be substantially the same position regardless of image height. In addition, in relation to a centroid position in an exit pupil of light sensed by the other phase difference detection pixel of the pair of phase difference detection pixels, positions from the center of the exit pupil in the other phase difference detection pixel may be substantially the same position regardless of image height. This leads to an operation in which a centroid position sensed by one phase difference detection pixel is made to be constant regardless of image height, and a centroid position sensed by the other phase difference detection pixel is made to be constant regardless of image height, thereby making phase difference detection characteristics constant regardless of the image height.

In the embodiment, the light blocking portion may be set such that a position of the image forming point and a position of the end portion become distant from each other according to an increase in the image height. This leads to an operation in which the light blocking portion is set such that a position of the image forming point and a position of the end portion of the light blocking portion on the entrance side become distant from each other according to an increase in the image height.

In addition, in the embodiment, a micro lens, a light sensing element, and a light blocking portion may constitute a phase difference detection pixel, and two phase difference detection pixels adjacent or close to each other may be used as a pair of phase difference detection pixels for performing the phase difference detection. The light blocking portion of one phase difference detection pixel of the pair of phase difference detection pixels may be set such that a position of the image forming point in the one phase difference detection pixel and a position of the end portion of the light blocking portion on the entrance side in the one phase difference detection pixel become distant from each other in one direction of the pupil division directions of the pair of phase difference detection pixels according to an increase in the image height. Further, the light blocking portion of the other phase difference detection pixel of the pair of phase difference detection pixels may be set such that a position of the image forming point in the other phase difference detection pixel and a position of the end portion of the light blocking portion on the entrance side in the other phase difference detection pixel become distant from each other in the other direction of the pupil division directions according to an increase in the image height. This leads to an operation in which the light blocking portion is set such that a position of the image forming point and a position of the end portion of the light blocking portion on the entrance side become distant from each other in one direction of the pupil division directions of the pair of phase difference detection pixels according to an increase in the image height in the one phase difference detection, and a position of the image forming point and a position of the end portion of the light blocking portion on the entrance side become distant from each other in the other direction of the pupil division directions according to an increase in the image height in the other phase difference detection pixel.

In the embodiment, the light blocking portion may be set such that a position of the image forming point and a position of the end portion become close to each other according to an increase in the image height. This leads to an operation in which the light blocking portion is set such that a position of the image forming point and a position of the end portion of the light blocking portion on the entrance side become close to each other according to an increase in the image height.

In the embodiment, a micro lens, a light sensing element, and a light blocking portion may constitute a phase difference detection pixel, and two phase difference detection pixels adjacent or close to each other may be used as a pair of phase difference detection pixels for performing the phase difference detection. The light blocking portion of one phase difference detection pixel of the pair of phase difference detection pixels may be set such that a position of the image forming point in the one phase difference detection pixel and a position of the end portion of the light blocking portion on the entrance side in the one phase difference detection pixel become close to each other in one direction of the pupil division directions of the pair of phase difference detection pixels according to an increase in the image height, and the light blocking portion of the other phase difference detection pixel of the pair of phase difference detection pixels may be set such that a position of the image forming point in the other phase difference detection pixel and a position of the end portion of the light blocking portion on the entrance side in the other phase difference detection pixel become close to each other in the other direction of the pupil division directions of the pair of phase difference detection pixels according to an increase in the image height. This leads to an operation in which the light blocking portion is set such that a position of the image forming point and a position of the end portion of the light blocking portion on the entrance side become close to each other in one direction of the pupil division directions according to an increase in the image height in the one phase difference detection pixel of the pair of phase difference detection pixels, and a position of the image forming point and a position of the end portion of the light blocking portion on the entrance side become close to each other in the other direction of the pupil division directions according to an increase in the image height in the other phase difference detection pixel.

In the embodiment, the light blocking portion may be set such that a predetermined position of the image height is used as a reference position, and a position of the image forming point and a position of the end portion correspond with each other at the reference position, and may be set such that the position of the image forming point and the position of the end portion become distant from each other according to a variation in the image height from the reference position. This leads to an operation in which a position of the image forming point and a position of the end portion correspond with each other at a predetermined position of the image height, and the position of the image forming point and the position of the end portion become distant from each other according to a variation in the image height from the reference position.

In addition, in the embodiment, a micro lens, a light sensing element, and a light blocking portion may constitute a phase difference detection pixel, and two phase difference detection pixels adjacent or close to each other may be used as a pair of phase difference detection pixels for performing the phase difference detection. The distance between a position of the image forming point and a position of the end portion of the light blocking portion on the entrance side in one phase difference detection pixel of the pair of phase difference detection pixels may be substantially the same as the distance between a position of the image forming point and a position of the end portion of the light blocking portion on the entrance side in the other phase difference detection pixel. This leads to an operation in which the distance between a position of the image forming point and a position of the end portion of the light blocking portion on the entrance side in one phase difference detection pixel of the pair of phase difference detection pixels is substantially the same as the distance between a position of the image forming point of the main light beams and a position of the end portion of the light blocking portion on the entrance side in the other phase difference detection pixel of the pair of phase difference detection pixels.

In the embodiment, an image forming point of subject light passing through the micro lens may be an image forming point of the main light beams passing through the micro lens. This leads to an operation in which a position of the end portion of the light blocking portion on the entrance side becomes distant from a position of the image forming point of the main light beams according to a variation in the image height.

According to another embodiment of the present disclosure, there is provided an imaging device including a micro lens that collects light from a subject; and a light sensing element that generates a signal for performing focusing determination through phase difference detection by sensing subject light collected by the micro lens, wherein the light sensing element is set such that a position of an image forming point of subject light passing through the micro lens and a position of an end portion of the light sensing element on the image forming point side become distant from each other according to a variation in image height. This leads to an operation in which, in a phase difference detection pixel, the light sensing element is set such that a position of the image forming point of subject light passing through the micro lens and a position of the end portion of the light sensing element on the image forming point side become distant from each other according to a variation in the image height.

According to still another embodiment of the present disclosure, there is provided an imaging apparatus including an imaging device including a micro lens that collects light from a subject, a light sensing element that generates a signal for performing focusing determination through phase difference detection by sensing subject light collected by the micro lens, and a light blocking portion that is disposed between the micro lens and the light sensing element and performs pupil division for the subject light by blocking a part of the subject light, wherein the light blocking portion is set such that a position of an image forming point of subject light passing through the micro lens and a position of an end portion of the light blocking portion on an entrance side become distant from each other according to a variation in image height; a focusing determination unit that performs focusing determination through phase difference detection based on a signal generated by a phase difference detection pixel; and an image generation unit that generates an image based on a signal generated by an image generation pixel. This leads to an operation in which, in a phase difference detection pixel, phase difference detection is performed using the imaging device in which the light blocking layer for pupil division is set such that a position of an image forming point of subject light passing through the micro lens and a position of an end portion of the light blocking portion on an entrance side become distant from each other according to a variation in image height.

According to the embodiments of the present disclosure, it is possible to achieve an excellent effect of improving the characteristics of a phase difference detection pixel in an imaging device.

BRIEF DESCRIPTION OF THE DRAWINGS

FIGS. 4A and 4B are schematic diagrams illustrating an example of the cross-sectional configuration of the image generation pixel and the phase difference detection pixel according to the first embodiment of the present disclosure.

DETAILED DESCRIPTION OF EMBODIMENTS

Hereinafter, embodiments of the present disclosure will be described. The description will be made in the following order.

1. FIRST EMBODIMENT (Imaging Control: an example of matching phase difference detection characteristics in a pair of on-axis phase difference detection pixels with phase difference detection characteristics in a pair of off-axis phase difference detection pixels)

2. SECOND EMBODIMENT (Imaging Control: an example of matching with phase difference detection characteristics in a pair of outermost off-axis phase difference detection pixels)

1. First Embodiment

Functional Configuration Example of Imaging Apparatus

Figure 1:
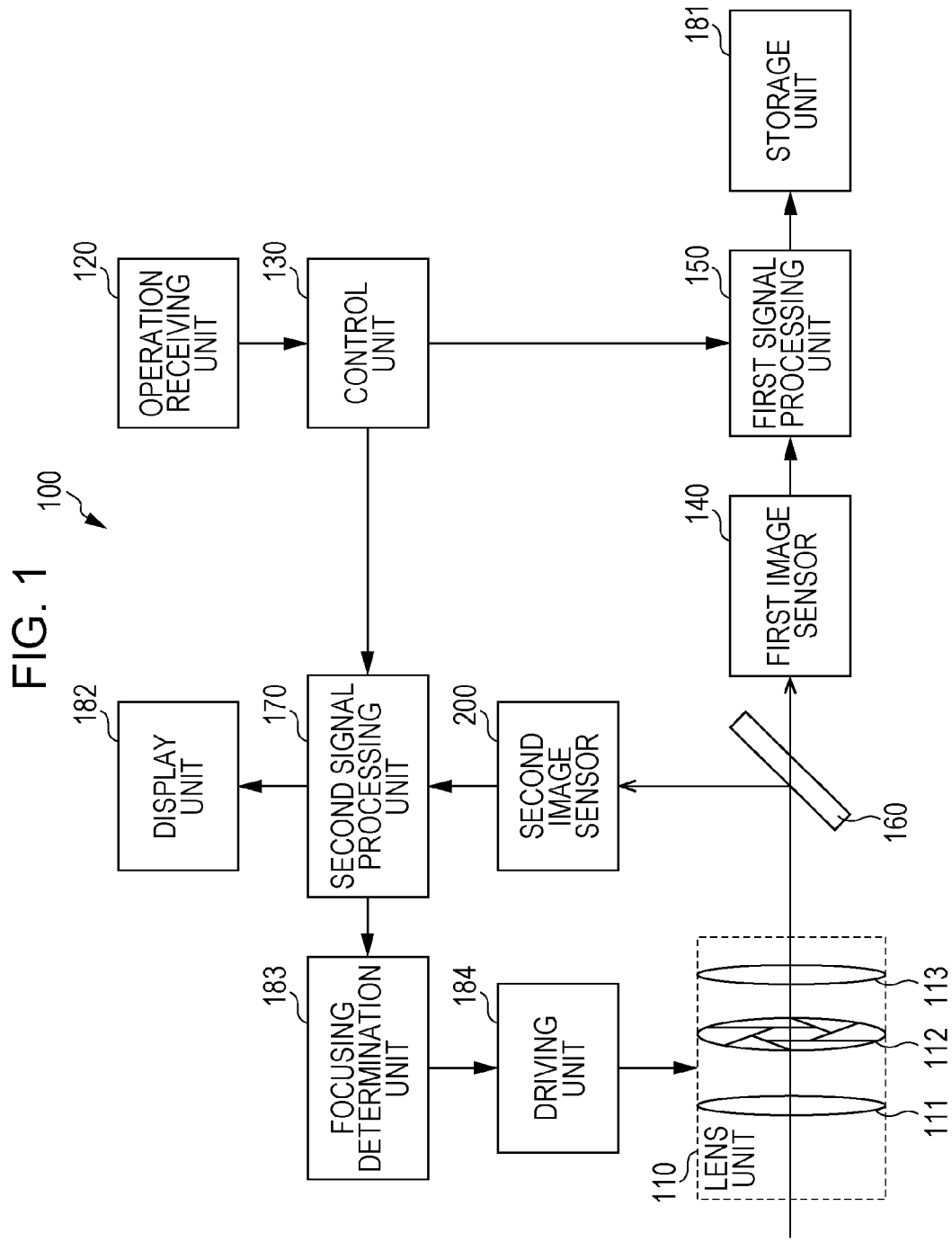
FIG. 1 is a block diagram illustrating an example of the functional configuration of an imaging apparatus according to a first embodiment of the present disclosure.

FIG. 1 is a block diagram illustrating an example of the functional configuration of an imaging apparatus 100 according to the first embodiment of the present disclosure. The imaging apparatus 100 is an imaging apparatus which generates image data (captured image) by imaging a subject and records the generated image data as image content (still image content or moving image content). In addition, hereinafter, an example where still image content (still image file) is recorded as image content (image file) will be mainly described.

The imaging apparatus 100 includes a lens unit 110, an operation receiving unit 120, a control unit 130, a first image sensor 140, and a first signal processing unit 150. Further, the imaging apparatus 100 includes a pellicle mirror 160, a second image sensor 200, a second signal processing unit 170, a storage unit 181, a display unit 182, a focusing determination unit 183, and a driving unit 184.

The lens unit 110 collects light from a subject (subject light). The lens unit 110 includes a zoom lens 111, a diaphragm 112, and a focus lens 113.

The zoom lens 111 is moved in the optical axis direction by driving of the driving unit 184 so as to vary a focal length, thereby adjusting the magnification of a subject included in a captured image.

The diaphragm 112 is a shield which varies an aperture extent through the driving of the driving unit 184 so as to adjust an amount of subject light incident to the first image sensor 140 and the second image sensor 200.

The focus lens 113 is moved in the optical axis direction by the driving of the driving unit 184, thereby adjusting focus.

The operation receiving unit 120 receives an operation from a user. For example, in a case where a shutter button (a shutter button 121 shown in FIG. 2) is pressed, the operation receiving unit 120 supplies a signal regarding the pressing to the control unit 130 as an operation signal.

The control unit 130 controls operations of the respective units of the imaging apparatus 100. For example, if the shutter button is pressed and an operation signal for starting recording of a still image is received, the control unit 130 supplies a signal regarding recording and execution of a still image (still image capturing operation signal) to the first signal processing unit 150. In addition, in a case where a live view is displayed on the display unit 182, the control unit 130 supplies a signal for generating a live view image based on a signal output by the second image sensor 200, to the second signal processing unit 170. Here, the live view refers to real-time display of a subject image which is incident to the imaging apparatus 100. Further, in a case of performing focusing determination using a phase difference detection method, the control unit 130 supplies a signal (phase difference detection operation signal) indicating an operation (phase difference detection operation) performing the focusing determination, to the second signal processing unit 170. Here, the phase difference detection method is a focus detection method in which light passing through the imaging lens undergoes pupil division so as to form a pair of images, and a focusing extent is detected by measuring (detecting a phase difference) a gap between the formed images (a misalignment amount between the images).

The pellicle mirror 160 divides subject light collected via the lens unit 110 into two parts. The pellicle mirror 160 is, for example, a transflective mirror, and divides the subject light into two parts by reflecting 30% of the subject light. The pellicle mirror 160 supplies one part of the light divided into two parts to the first image sensor 140 and supplies the other thereof to the second image sensor 200.

The first image sensor 140 is an imaging device which senses one part of the subject light divided by the pellicle mirror 160 and performs photoelectric conversion for the sensed subject light to generate an electric signal. The first image sensor 140 is implemented by, for example, a CMOS (Complementary Metal Oxide Semiconductor) sensor, a CCD (Charge Coupled Device) sensor, or the like. In the first image sensor 140, only pixels (image generation pixels) which generates a signal for generating a captured image based on the sensed subject light are disposed in a Bayer array. The first image sensor 140 supplies an electric signal generated through the photoelectric conversion to the first signal processing unit 150.

The first signal processing unit 150 performs various kinds of signal processes for the electric signal supplied from the first image sensor 140. For example, in a case where the still image capturing operation signal is supplied from the control unit 130, the first signal processing unit 150 performs various kinds of signal processes, thereby generating data for a still image (still image data). In addition, the first signal processing unit 150 supplies the generated image data to the storage unit 181 for storage in the storage unit 181.

The storage unit 181 records the image data supplied from the first signal processing unit 150 as image content (image file). For example, as the storage unit 181, a removable recording medium (one or a plurality of recording media) such as a disc such as a DVD (Digital Versatile Disc) or a semiconductor memory such as a memory card may be used. In addition, the recording medium may be built in the imaging apparatus 100 or may be attachable to and detachable from the imaging apparatus 100.

The second image sensor 200 is an imaging device which senses one part of the subject light divided by the pellicle mirror 160, and performs photoelectric conversion for the sensed subject light to generate an electric signal. The second image sensor 200 is implemented by, for example, a CMOS sensor or a CCD sensor, in the same manner as the first image sensor 140. In the second image sensor 200, image generation pixels and pixels generating a signal for detecting a phase difference (phase difference detection pixels) are disposed. In addition, the second image sensor 200 will be described with reference to FIG. 3 and thereafter. The second image sensor 200 supplies an electric signal generated through the photoelectric conversion to the second signal processing unit 170. In addition, the second image sensor 200 is an example of the imaging device recited in the claims.

The second signal processing unit 170 performs various kinds of signal processes for the electric signal supplied from the second image sensor 200. For example, in a case where the phase difference detection operation signal is supplied from the control unit 130, the second signal processing unit 170 generates data for detecting a phase difference (phase difference detection data) based on an output signal from the phase difference detection pixels in the second image sensor 200. In addition, the second signal processing unit 170 supplies the generated phase difference detection data to the focusing determination unit 183. Further, in a case where a live view display signal is supplied from the control unit 130, the second signal processing unit 170 generates data for a live view image (live view image data) based on an output signal from the image generation pixels in the second image sensor 200. The second signal processing unit 170 supplies the generated live view image data to the display unit 182, and displays the live view on a display screen of the display unit 182. In addition, the second signal processing unit 170 is an example of the image generation unit recited in the claims.

The display unit 182 displays an image based on the image data supplied from the second signal processing unit 170. The display unit 182 is implemented by, for example, a color liquid crystal panel. For example, in a case where the live view image data is supplied from the second signal processing unit 170, the display unit 182 displays a live view image on the display screen.

The focusing determination unit 183 determines whether or not a target to be focused (focusing target) is focused based on the phase difference detection data supplied from the second signal processing unit 170. If an object (focusing target) in a region which is focused (focus region), the focusing determination unit 183 supplies information indicating the focusing to the driving unit 184 as focusing determination result information. In addition, if the focusing target is not focused, the focusing determination unit 183 calculates a focus misalignment amount (defocus amount), and supplies information indicating the calculated defocus amount to the driving unit 184 as focusing determination result information.

The driving unit 184 drives the zoom lens 111, the diaphragm 112, and the focus lens 113. For example, the driving unit 184 calculates a driving amount of the focus lens 113 based on the focusing determination result information output from the focusing determination unit 183, and moves the focus lens 113 according to the calculated driving amount. If the focus is aligned, the driving unit 184 maintains a current position of the focus lens 113. In addition, if the focus is misaligned, the driving unit 184 calculates a driving amount (movement distance) based on the focusing determination result information indicating the defocus amount and positional information of the focus lens 113, and moves the focus lens 113 according to the driving amount.

Position Example of Pellicle Mirror

Figure 2:
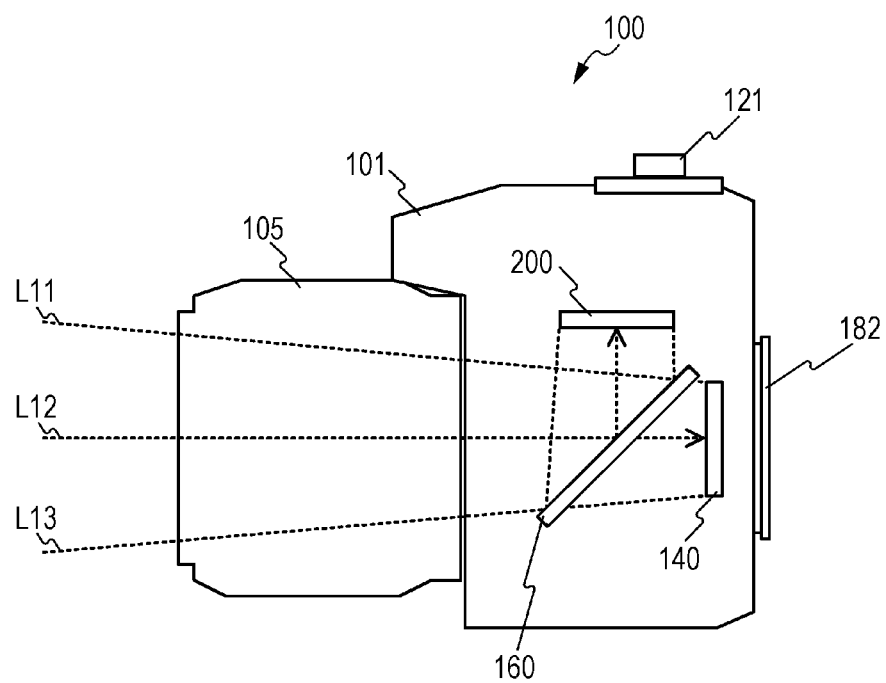
FIG. 2 is a cross-sectional view schematically illustrating an example of the position of the pellicle mirror in the imaging apparatus according to the first embodiment of the present disclosure.

FIG. 2 is a cross-sectional view schematically illustrating an example of the position of the pellicle mirror 160 in the imaging apparatus 100 according to the first embodiment of the present disclosure. In addition, description will be made assuming that the imaging apparatus 100 is a single lens camera in the same figure.

FIG. 2 is a cross-sectional view of the imaging apparatus 100, and shows a body 101 and a replacement lens 105. The replacement lens 105 is an attachable and detachable lens unit in the imaging apparatus 100, and corresponds to the lens unit 110 shown in FIG. 1. The body 101 is a main body which performs an imaging process in the imaging apparatus 100 and corresponds to the configuration other than the lens unit 110 shown in FIG. 1. In the body 101, the shutter button 121, the display unit 182, the pellicle mirror 160, the first image sensor 140, the second image sensor 200, and the replacement lens 105 are shown.

In addition, in the same figure, the optical axis (optical axis L12) in the lenses provided in the lens unit 110, and two lines (lines L11 and L13) indicating a range where the subject light passes, are shown. Further, the range between the lines L11 and L13 indicates a range where light incident to the first image sensor 140 and the second image sensor 200 passes.

The pellicle mirror 160 is disposed so as to divide subject light incident to the imaging apparatus 100 into two parts. For example, the pellicle mirror 160 is disposed so as to form 45° with respect to the optical axis L12. Thereby, the pellicle mirror 160 reflects a portion of the subject light (for example, 30%) upwards.

The first image sensor 140 is disposed perpendicularly to the optical axis L12 in front (traveling destination of the subject light) of the pellicle mirror 160 so as to sense the subject light transmitted through the pellicle mirror 160.

The second image sensor 200 is disposed horizontally to the optical axis L12 (because the pellicle mirror 160 forms 45° with respect to the optical axis L12) on the upper side of the pellicle mirror 160 so as to sense the subject light reflected by the pellicle mirror 160.

As above, in the imaging apparatus 100, the pellicle mirror 160 is disposed so as to divide incident subject light into two parts. The first image sensor 140 and the second image sensor 200 are respectively disposed so as to sense the subject light divided into two parts.

Arrangement Example of Pixels in Second Image Sensor

Figure 3:
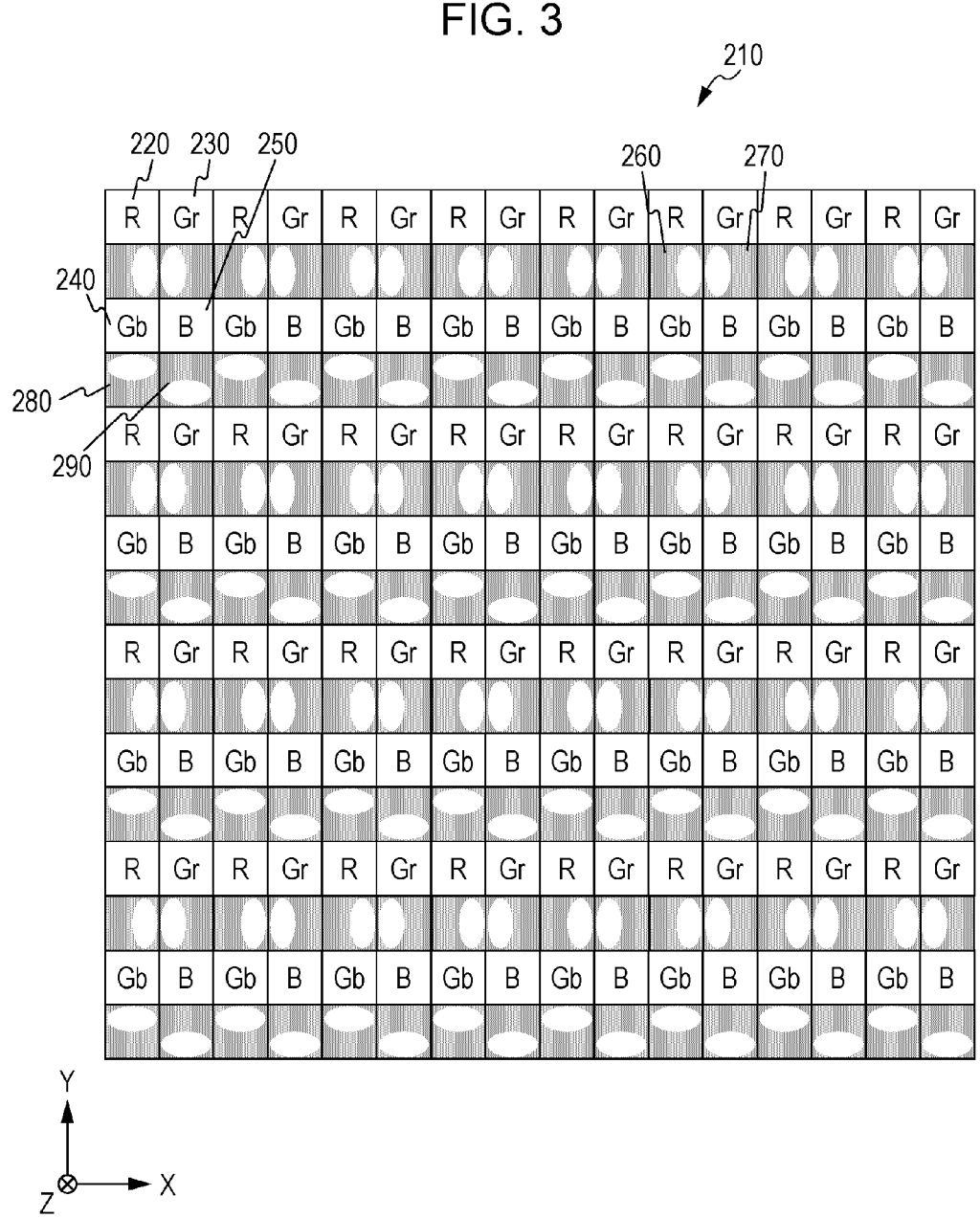
FIG. 3 is a schematic diagram illustrating an example of the arrangement of pixels provided in the second image sensor according to the first embodiment of the present disclosure.

FIG. 3 is a schematic diagram illustrating an example of the arrangement of the pixels provided in the second image sensor 200 according to the first embodiment of the present disclosure.

Description will be made assuming XY axes having the vertical direction as a Y axis, and the horizontal direction as an X direction in the same figure. In addition, in the same figure, the bottom left corner is assumed as the origin of the XY axes, the upward direction is + side of the Y axis, and the rightward direction is + side of the X axis. Further, in the same figure, a specific direction (direction corresponding to the horizontal direction (left and right direction) of a captured image) in the second image sensor 200 is the X axis direction, and a direction (direction corresponding to the vertical direction (up and down direction) of the captured image) perpendicular to the specific direction is the Y axis direction. It is assumed that a signal reading direction in the second image sensor 200 is the X axis direction (read with the row units).

In FIG. 3, for convenience of description, the description is made using a region (region 210) of a portion (pixels of 16 rows×16 columns) of pixels included in the second image sensor 200. In addition, the pixels in the second image sensor 200 are arranged such that the pixel arrangement shown in the region 210 corresponds to one unit, and the pixel arrangement corresponding to the unit (pixel arrangement corresponding to the region 210) is repeated in the X axis direction and the Y axis direction.

In the same figure, a pixel is denoted by a square. In addition, in the same figure, the image generation pixels are denoted by squares containing signs (R, G and B) which indicate color filters provided therein. That is to say, an R pixel 220 indicates a pixel (R pixel) sensing red light by a color filter which transmits red (R) light therethrough, and a B pixel 250 indicates a pixel (B pixel) sensing blue light by a color filter which transmits blue (B) light therethrough. In addition, a Gr pixel 230 is a pixel (G pixel) sensing green light by a color filter which transmits green (G) light therethrough, and indicates a G pixel in a row (line) including the R pixel (the R pixel 220). Similarly, a Gb pixel 240 is a pixel (G pixel) sensing green light by a color filter which transmits green (G) light therethrough, and indicates a G pixel in a row (line) including the B pixel (the B pixel 250).

In addition, the phase difference detection pixel is denoted by a gray square to which a white ellipse is added. The white ellipse in the phase difference detection pixel indicates a side where incident light is sensed by the light sensing element (a side where an aperture portion is present in a light blocking layer (pupil division light blocking layer) for performing pupil division). Here, the phase difference detection pixels (a right aperture phase difference detection pixel 260, a left aperture phase difference detection 270, an upper aperture phase difference detection pixel 280, and a lower aperture phase difference detection 290) shown in the same figure will be described.

The right aperture phase difference detection pixel 260 is a phase difference detection pixel where the pupil division light blocking layer is formed so as to block subject light which has passed through the right half of the exit pupil, of subject light incident to a micro lens of the right aperture phase difference detection pixel 260. In other words, the right aperture phase difference detection pixel 260 blocks right half light of light which is pupil-divided into left and right (the + and − sides in the X axis direction) of the exit pupil, and senses left half pupil-divided light.

The left aperture phase difference detection pixel 270 is a phase difference detection pixel where the pupil division light blocking layer is formed so as to block subject light which has passed through the left half of the exit pupil, of subject light incident to a micro lens of the left aperture phase difference detection pixel 270. In other words, the left aperture phase difference detection pixel 270 blocks left half light of light which is pupil-divided into left and right (the + and − sides in the X axis direction) of the exit pupil, and senses right half pupil-divided light. In addition, the left aperture phase difference detection 270 is used with the right aperture phase difference detection pixel 260 as a pair, so as to form a pair of images.

The upper aperture phase difference detection pixel 280 is a phase difference detection pixel where the pupil division light blocking layer is formed so as to block subject light which has passed through the upper half of the exit pupil, of subject light incident to a micro lens of the upper aperture phase difference detection pixel 280. In other words, the upper aperture phase difference detection pixel 280 blocks upper half light of light which is pupil-divided into upper and lower parts (the + and − sides in the Y axis direction) of the exit pupil, and senses lower half pupil-divided light.

The lower aperture phase difference detection pixel 290 is a phase difference detection pixel where the pupil division light blocking layer is formed so as to block subject light which has passed through the lower half of the exit pupil, of subject light incident to a micro lens of the lower aperture phase difference detection pixel 290. In other words, the lower aperture phase difference detection pixel 290 blocks lower half light of light which is pupil-divided into upper and lower parts (the + and − sides in the Y axis direction) of the exit pupil, and senses upper half pupil-divided light. In addition, the lower aperture phase difference detection 290 is used with the upper aperture phase difference detection pixel 280 as a pair, so as to form a pair of images.

Here, the pixel arrangement in the second image sensor 200 will be described.

In the second image sensor 200, a row (line) where the image generation pixel is arranged and a row (line) where the phase difference detection pixel is arranged are alternately arranged. That is to say, as shown in FIG. 3, the image generation pixel, the phase difference detection pixel, the image generation pixel, the phase difference detection pixel, . . . are alternately arranged in the Y axis direction. In addition, in the second image sensor 200, in terms of the arrangement of only the image generation pixel except for the rows where the phase difference detection pixels are arranged, the row where the B pixel and the G pixel are arranged and the row where the R pixel and the G pixel are arranged are alternately arranged, which form a Bayer array.

In addition, in the second image sensor 200, the line where the right aperture phase difference detection pixel 260 and the left aperture phase difference detection 270 are arranged and the line where the upper aperture phase difference detection pixel 280 and the lower aperture phase difference detection 290 are arranged are alternately arranged with the row of the image generation pixels interposed therebetween. That is to say, in relation to the phase difference detection pixel, the phase difference detection pixels performing pupil division are arranged in the same direction (a reading direction (left and right) or a direction (upper and lower) perpendicular to the reading direction) with the row units.

Next, a cross-sectional configuration of the image generation pixel and a cross-sectional configuration of the phase difference detection pixel according to the first embodiment of the present disclosure will be described using the R pixel shown in FIG. 3 and a cross-sectional view of the right aperture phase difference detection pixel.

Cross-Sectional Configuration Example of Image Generation Pixel and Phase Difference Detection Pixel FIGS. 4A and 4B are schematic diagrams illustrating an example of the cross-sectional configurations of the image generation pixel and the phase difference detection pixel according to the first embodiment of the present disclosure.

In addition, in the same figures, the cross-sectional configurations of the image generation pixel and the phase difference detection pixel around the center (on-axis) of the second image sensor 200 will be described.

FIG. 4A schematically shows a cross-sectional configuration of the image generation pixel. In addition, the difference among the on-axis three-color image generation pixels (the R pixel, the G pixel, and the B pixel) in the first embodiment of the present disclosure is only a color filter. Thus, only a cross-sectional configuration of the R pixel (the R pixel 220 shown in FIG. 3) will be described in FIG. 4A. In addition, the same figures show cross-sectional configurations where the horizontal direction is an X axis direction, and the vertical direction is a Z axis direction.

FIG. 4A shows a micro lens 221, an R filter 222, a light sensing element 223, a wire layer 224, and a wire layer 225 as the cross-sectional configuration of the R pixel 220.

The micro lens 221 is a lens for collecting subject light at the light sensing element 223.

The R filter 222 is a color filter which transmits light of a wavelength range showing red (R) therethrough, and allows light of the wavelength range showing red to be sensed by the light sensing element 223 of the R pixel 220.

The light sensing element 223 converts the sensed light into an electric signal so as to generate an electric signal with intensity corresponding to an amount of the sensed light. The light sensing element 223 is formed by, for example, a photodiode (PD). Further, the light sensing element 223 which has as wide an area as possible is disposed in order to sense light collected by the micro lens 221 with economy.

The wire layer 224 and the wire layer 225 are wires for connecting the respective circuits to each other in the R pixel 220. In FIG. 4A, three wires which are disposed in a layer form with respect to the optical axis of the micro lens 221 are shown in the wire layers 224 and 225 as an example. The wire layers 224 and 225 are disposed so as not to hinder light sensed by the micro lens 221 from entering the light sensing element 223. The wire layers 224 and 225 are metals, and thus function as light blocking layers which block subject light from reaching adjacent pixels. Further, the first metal layer (layer close to the micro lens 221) in the wire layers 224 and 225 is not generally wire and is used as a light blocking layer, but, for convenience, is indicated as a wire layer in this figure.

FIG. 4B schematically shows a cross-sectional configuration of the phase difference detection pixel. In addition, in the first embodiment of the present disclosure, it is assumed that a filter (for example, a transparent layer, a W filter, or the like) which transmits light of a visible light range therethrough is provided in the color filter layer of the phase difference detection pixel. Further, in FIG. 4B, description will be made assuming that a filter (W filter) which transmits light of a visible light range therethrough but absorbs light of wavelengths other than that is used as the color filter of the phase difference detection pixel.

In addition, arrangement directions of the light blocking layers for performing pupil division are different from each other in the four phase difference detection pixels disposed at the on-axis position according to the first embodiment of the present disclosure. For this reason, in the same figure, a cross-sectional configuration of the right aperture phase difference detection pixel (the right aperture phase difference detection pixel 260) will be described, and description of the left aperture phase difference detection pixel, the upper aperture phase difference detection pixel, and the lower aperture phase difference detection pixel will be omitted.

FIG. 4B shows a micro lens 261, a W filter 262, a light sensing element 263, a wire layer 264, and a wire layer 265, as a cross-sectional configuration of the right aperture phase difference detection pixel 260.

The micro lens and the light sensing element (the micro lens 261 and the light sensing element 263) of the phase difference detection pixel is the same as the micro lens and the light sensing element of the image generation pixel shown in FIG. 4A. In addition, the W filters 262 is the same as the R filter 222 shown in FIG. 4A except for the spectral characteristics. For this reason, here, attention is paid to the wire layers 264 and 265 which will be described.

The wire layers 264 and 265 are wires for connecting the respective circuits to each other in the right aperture phase difference detection pixel 260 in the same manner as the wire layers 224 and 225 shown in FIG. 4A. In the wire layers 264 and 265, three wires which are disposed in a layer form with respect to the optical axis of the micro lens 261 are shown in the same manner as the wire layers 224 and 225 shown in FIG.

4A. In addition, the respective wires in the wire layers 264 and 265 are disposed on the same layers as the wire layers 224 and 225 shown in FIG. 4A.

In addition, the wire layer 264 includes a wire layer (a light blocking layer 266) which protrudes so as to block light from the left side to the periphery of the center of the light sensing element 263. The light blocking layer 266 is disposed such that an image forming point of the main light beam passing through the micro lens 261 is located around the right end of the protrusion (around the end of the aperture portion (entrance) which is not covered with the light blocking layer 266 and the wire layer 265) in the on-axis phase difference detection pixel. In addition, the light blocking layer 266 in an off-axis phase difference detection pixel of the second image sensor 200 according to the first embodiment of the present disclosure will be described with reference to FIGS. 10A and 10B.

In other words, in the right aperture phase difference detection pixel 260, due to the light blocking layer 266, subject light (a portion of subject light) having passed through the right half of the exit pupil is blocked by the light blocking layer, and subject light having passed through the left half of the exit pupil passes through the entrance and is sensed by the light sensing element 263. In addition, the layer (the wire located at the lowest position of the wire layer 265) with the same height as the light blocking layer 266 in the wire layer 265 is disposed so as not to hinder the light which is not blocked by the light blocking layer 266 from entering the light sensing element 263.

As such, half of the light sensing element is covered with the light blocking layer in the on-axis phase difference detection pixel. Thereby, in the on-axis phase difference detection pixel, half of the subject light passing through the micro lens is blocked and the remaining half thereof is sensed by the light sensing element, and thereby the subject light is pupil-divided.

In addition, in the same figure, the cross-sectional configuration of the image generation pixel located at a position (on-axis of the image sensor) where the main light beam is parallel to the optical axis of the micro lens has been described. The main light beam incident to the phase difference detection pixel alters its angles according to its direction toward the off-axis from the on-axis of the image sensor (according to an increase in the image height). Therefore, by matching a positional relationship between the micro lens, the light blocking layer, and the light sensing element in the phase difference detection pixel with an angle of the main light beam, it is possible to perform pupil division where half of subject light is blocked and the remaining half thereof is sensed, in the same manner as the on-axis phase difference detection pixel.

Next, the image sensor where a positional relationship between the micro lens, the light blocking layer, and the light sensing element is matched with an angle of the main light beam will be described as an image sensor according to an embodiment of the present disclosure with reference to FIGS. 5A to 7C. Further, problems occurring in the image sensor according to the embodiment of the present disclosure will be described with reference to FIGS. 8A to 9D.

Figure 5A:
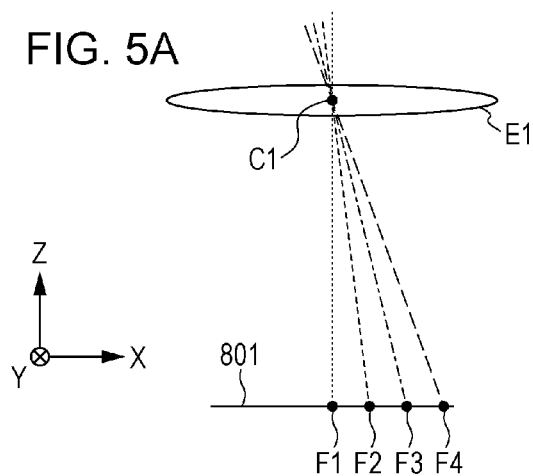
FIGS. 5A to 5C are schematic diagrams illustrating an example of the angle of the main light beam and an example of the position of the light blocking layer for each image height in the image sensor according to the embodiment of the present disclosure.
Figure 5B:
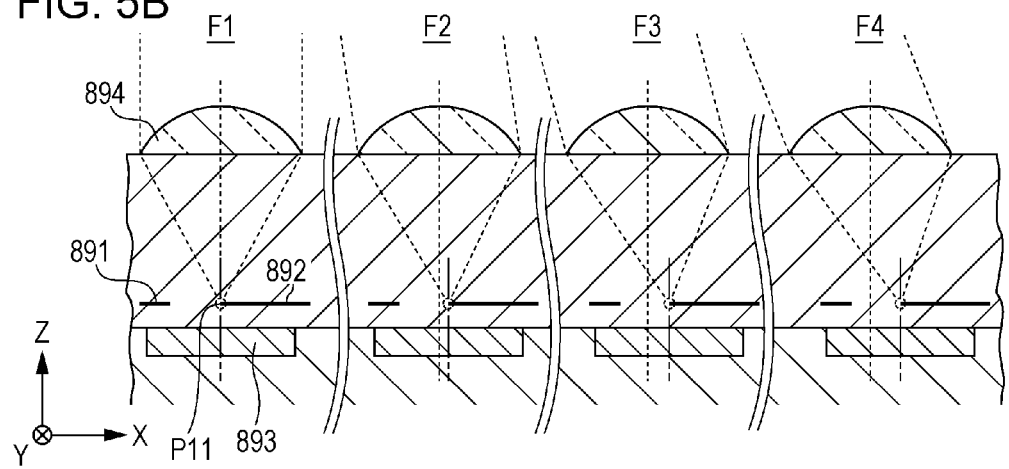
Figure 5C:
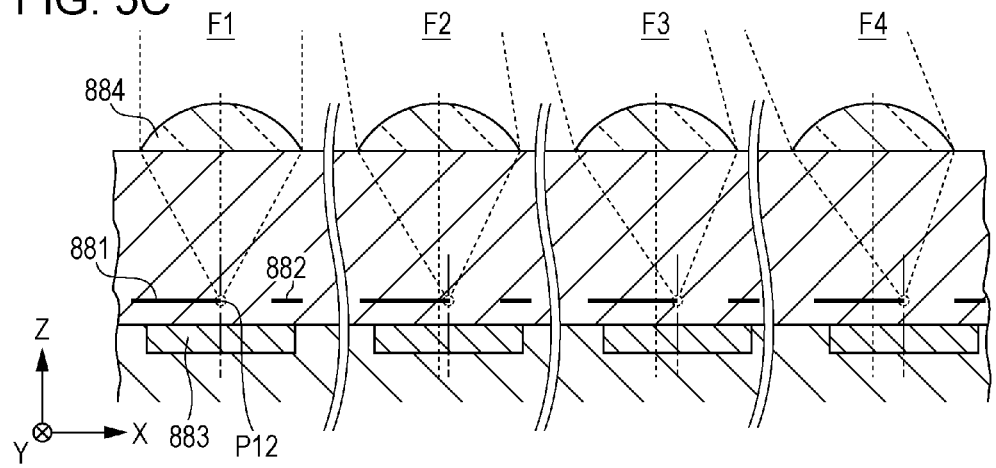

Example of Position of Light Blocking Layer at Each Image Height in Image Sensor According to Embodiment of the Present Disclosure FIGS. 5A to 5C are schematic diagrams illustrating an example of the angle of the main light beam and an example of the position of the light blocking layer at each image height in the image sensor according to the embodiment of the present disclosure.

FIG. 5A schematically shows an example of the angle of the main light beam in the image sensor according to the embodiment of the present disclosure. FIG. 5A shows an exit pupil E1, a line (light sensing surface 801) schematically indicating a light sensing surface of the image sensor according to the embodiment of the present disclosure, predetermined positions (positions F1 to F4) on the light sensing surface 801, and main light beams (four lines passing through the center C1) with respect to the positions F1 to F4.

The position F1 is a position of the light sensing surface 801 through which the main light beam (angle of 0°) parallel to the optical axis of the exit pupil E1 passes. The position F2 is a position through which the main light beam tilted by about 5° with respect to the optical axis passes; the position F3 is position through which the main light beam tilted by about 10° with respect to the optical axis beam passes; and the position F4 is a position through which the main light beam tilted by about 15° with respect to the optical axis passes.

As such, an angle of the main light beam incident to each pixel of the image sensor is altered according to the image height in the image sensor (an angle of the main light beam becomes larger according to an increase in an angle of the main light beam). Since the main light beam is a light beam passing through the center (center C1) of the exit pupil, it is necessary to align the end portion of the light blocking layer on the entrance side of the phase difference detection pixel with an image forming point of the main light beam (the center of the image forming point of subject light passing through the micro lens) in order to perform pupil division with accuracy. Therefore, in the image sensor according to the embodiment of the present disclosure, a position of the end portion of the light blocking layer on the entrance side of the phase difference detection pixel is aligned with a position of the image forming point of the main light beam.

Next, the light blocking layer of the phase difference detection pixel in the image sensor according to the embodiment of the present disclosure will be described with reference to FIGS. 5B and 5C. In addition, the left aperture phase difference detection pixel and the right aperture phase difference detection pixel are different from the upper aperture phase difference detection pixel and the lower aperture phase difference detection pixel only in a pupil division direction. Therefore, from the same figures and thereafter, the left aperture phase difference detection pixel and the right aperture phase difference detection pixel will be described, and description of the upper aperture phase difference detection pixel and the lower aperture phase difference detection pixel will be omitted.

FIG. 5B shows a cross-sectional configuration of the left aperture phase difference detection pixel and an image forming point of the main light beams by the micro lens of the left aperture phase difference detection pixel at the four positions (positions F1 to F4 in FIG. 5A) of the image sensor according to the embodiment of the present disclosure. In addition, in the same figure, for convenience of description, the W filter of the phase difference detection pixel is not shown.

In FIG. 5B, the left aperture phase difference detection pixel at the position F1 in FIG. 5A (around the center of the image sensor) is shown at first on the left side, and the left aperture phase difference detection pixels at the positions F2 to F4 are sequentially shown rightward. In addition, in FIG. 5B, as a cross-sectional configuration of each left aperture phase difference detection pixel, light blocking layers 891 and 892, a light sensing element 893, and a micro lens 894 are shown. Further, the micro lens 894 corresponds to the micro lens 261 shown in FIG. 4B. The light sensing element 893 corresponds to the light sensing element 263 shown in FIG.

4B; the light blocking layer 892 corresponds to the light blocking layer 266 in FIG. 4B; and the light blocking layer 891 corresponds to the lowest wire of the wire layer 265 in FIG. 4B.

In addition, light beams passing through the left end and the right end of the micro lens 894 of the main light beams incident to the micro lens 894 are indicated by the broken lines which pass through the image forming point from the micro lens 894. In addition, the image forming point (main light beam image forming point P11) of the main light beams incident to the micro lens 894 is shown at a position where the broken lines intersect each other in the cross-sectional configuration of each left aperture phase difference detection pixel.

In the image sensor according to the embodiment of the present disclosure, a position of the micro lens 894 with respect to the light sensing element 893 is deviated from the central side of the image sensor according to an increase in the image height such that light beams collected by the micro lens 894 are sensed by the light sensing element 893 without omission. In addition, in the image sensor according to the embodiment of the present disclosure, the light blocking layer 892 is disposed such that the left end of the light blocking layer 892 (the end portion of the entrance side of the light blocking layer 892) is aligned with the position of the image forming point of the main light beams (main light beam image forming point P11).

FIG. 5C shows a cross-sectional configuration of the right aperture phase difference detection pixel and an image forming point of the main light beams by the micro lens of the left aperture phase difference detection pixel at the four positions (positions F1 to F4 in FIG. 5A) of the image sensor according to the embodiment of the present disclosure.

In FIG. 5C, the right aperture phase difference detection pixel at the position F1 in FIG. 5A (around the center of the image sensor) is shown at first, and the right aperture phase difference detection pixels at the positions F2 to F4 are sequentially shown rightward. In addition, in FIG. 5C, as a cross-sectional configuration of each left aperture phase difference detection pixel, light blocking layers 881 and 882, a light sensing element 883, and a micro lens 884 are shown. Further, the micro lens 884 corresponds to the micro lens 261 shown in FIG. 4B. The light sensing element 883 corresponds to the light sensing element 263 shown in FIG. 4B; the light blocking layer 882 corresponds to the light blocking layer 266 in FIG. 4B; and the light blocking layer 881 corresponds to the lowest wire of the wire layer 265 in FIG. 4B.

In addition, light beams passing through the left end and the right end of the micro lens 884 of the main light beams incident to the micro lens 884 are indicated by the broken lines which pass through the image forming point from the micro lens 884. In addition, the image forming point (main light beam image forming point P12) of the main light beams incident to the micro lens 884 is shown at a position where the broken lines intersect each other in the cross-sectional configuration of each right aperture phase difference detection pixel.

In the same manner as the left aperture phase difference detection pixel shown in FIG. 5B, in the right aperture phase difference detection pixel shown in FIG. 5C as well, a position of the micro lens 884 with respect to the light sensing element 883 is deviated from the central side of the image sensor. In addition, in relation to positions of the light blocking layer 881 and the light blocking layer 882, in the same manner as the left aperture phase difference detection pixel shown in FIG. 5B, the light blocking layer 882 is disposed such that the end portion of the entrance side of the light blocking layer 882 is aligned with the position of the main light beam image forming point P12.

In this way, in the image sensor according to the embodiment of the present disclosure, the light blocking layers of the phase difference detection pixel are disposed such that positions of the end portions of the entrance sides of the light blocking layers (the light blocking layer 892 and the light blocking layer 881) are aligned with the image forming points of the main light beams.

Next, characteristics of the phase difference detection pixel around the center (on-axis) of the image sensor will be described with reference to FIGS. 6A to 6D.

Example of Characteristics of on-Axis Phase Difference Detection Pixel

FIGS. 6A to 6D are diagrams schematically illustrating subject light sensed by phase difference detection pixels disposed around the center (on-axis) of the image sensor according to the embodiment of the present disclosure, graphs indicating characteristics of the phase difference detection pixels, and a graph indicating subject light sensed by the phase difference detection pixels.

Figure 6A:
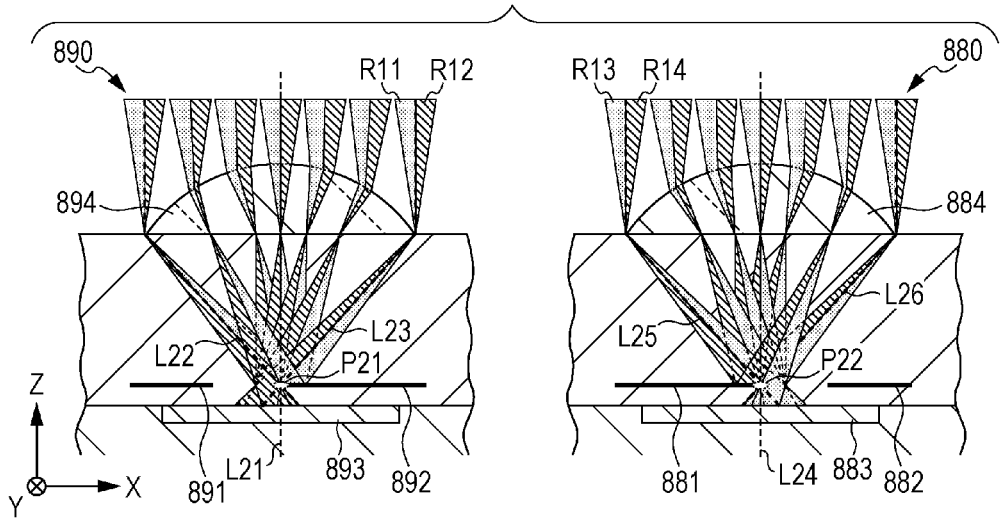
FIGS. 6A to 6D are diagrams schematically illustrating subject light sensed by phase difference detection pixels disposed around the center (on-axis) of the image sensor according to the embodiment of the present disclosure, graphs indicating characteristics of the phase difference detection pixel, and a graph indicating subject light sensed by the phase difference detection pixels.

FIG. 6A schematically shows cross-sectional configurations of a left aperture phase difference detection pixel 890 and a right aperture phase difference detection pixel 880 disposed around the center of the image sensor according to the embodiment of the present disclosure, and subject light incident to the phase difference detection pixels. FIG. 6A shows the light sensing element 893, the light blocking layer 891, the light blocking layer 892, and the micro lens 894 as the cross-sectional configuration of the left aperture phase difference detection pixel 890. In addition, the light sensing element 883, the light blocking layer 881, the light blocking layer 882, and the micro lens 884 are shown as the cross-sectional configuration of the right aperture phase difference detection pixel 880.

In addition, in the cross-sectional configurations of the left aperture phase difference detection pixel 890 and the right aperture phase difference detection pixel 880, a portion of the subject light passing through the right half region of the exit pupil is indicated by gray regions (for example, regions R12 and R14). Further, a portion of subject light passing through the left half of the exit pupil is indicated by dotted regions (for example, regions R11 and R13).

In the left aperture phase difference detection pixel 890 and the right aperture phase difference detection pixel 880, the broken lines L22 and L25 indicate paths of subject light beams incident to the leftmost ends of the micro lenses, of subject light beams which pass through the centers of the exit pupils and are incident to the micro lenses. In the same manner, the broken lines L23 and L26 indicate paths of subject light beams incident to the rightmost ends of the micro lenses, of subject light beams which pass through the centers of the exit pupils and are incident to the micro lenses. The optical axes L21 and L24 respectively indicate optical axes of the micro lenses 894 and 884.

Here, subject light sensed by the phase difference detection pixel disposed around the center of the image sensor according to the embodiment of the present disclosure will be described. In addition, the difference between the left aperture phase difference detection pixel 890 and the right aperture phase difference detection pixel 880 is that positions of the light blocking layers covering the light sensing elements are opposite to each other, and thus the left aperture phase difference detection pixel 890 will be described here.

In the left aperture phase difference detection pixel 890 disposed around the center of the image sensor according to the embodiment of the present disclosure, the subject light (main light beams) passing through the center of the exit pupil is incident to the micro lens 894 as light parallel to the optical axis (optical axis L21) of the micro lens. In addition, the main light beams are collected at one point (main light beam image forming point P21) on the optical axis L21.

Further, in the left aperture phase difference detection pixel 890, the left end of the light blocking layer 892 (the end portion of the entrance side of the light blocking layer 892) is disposed to be aligned with the main light beam image forming point P21. In other words, in the left aperture phase difference detection pixel 890, light is blocked from reaching the right half of the light sensing element 893, and light reaches the left half of the light sensing element 893 due to the light blocking layers 891 and 892. Thereby, the incident light (the subject light indicated by the dotted region in FIG. 6A) from the left half region of the exit pupil is blocked by the light blocking layer 892. On the other hand, the incident light (the subject light indicated by the gray region in FIG. 6A) from the right half region of the exit pupil is sensed by the light sensing element 893.

In addition, in the right aperture phase difference detection pixel 880, the incident light from the right half region of the exit pupil is blocked by the light blocking layer 881, and the incident light from the left half region of the exit pupil is sensed by the light sensing element 883.

Figure 6B:
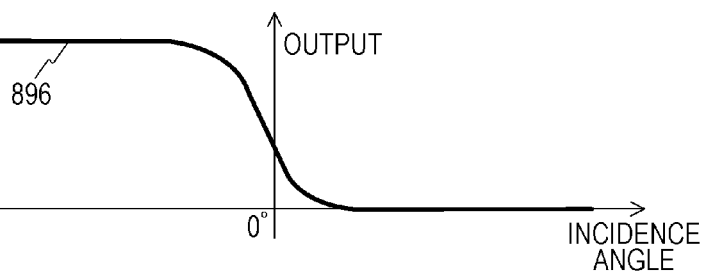

FIG. 6B shows a characteristic of the left aperture phase difference detection pixel (left aperture phase difference detection pixel light sensing characteristic 896) disposed around the center of the image sensor according to the embodiment of the present disclosure. The graph shown in FIG. 6B in which the transverse axis expresses an incidence angle of light incident to the micro lens 894 of the left aperture phase difference detection pixel 890, and the longitudinal axis expresses an output of a signal generated by the light sensing element 893, indicates the left aperture phase difference detection pixel light sensing characteristic 896. In addition, in relation to the incidence angle shown in the same figure, a light beam parallel to the optical axis of the micro lens forms "0°", and a light beam traveling from the top left to the bottom right forms a positive angle in the pupil division direction (the left and right direction in the left aperture phase difference detection pixel and the right aperture phase difference detection pixel).

The left aperture phase difference detection pixel characteristic 896 indicates that, using subject light with the incidence angle of "0°" as a boundary line, subject light with an incidence angle smaller than "0°" is sensed, and subject light with an incidence angle greater than "0°" is not sensed. That is to say, the left aperture phase difference detection pixel light sensing characteristic 896 indicates that subject light with an incidence angle smaller than "0°" (subject light incident to the micro lens from the right side of the optical axis L21 (subject light passing through the right half of the exit pupil)) is sensed by the light sensing element 893. In the same manner, the left aperture phase difference detection pixel light sensing characteristic 896 indicates that subject light with an incidence angle greater than "0°" (subject light incident to the micro lens from the left side of the optical axis L21 (subject light passing through the left half of the exit pupil)) is blocked by the light blocking layer 892.

Figure 6C:
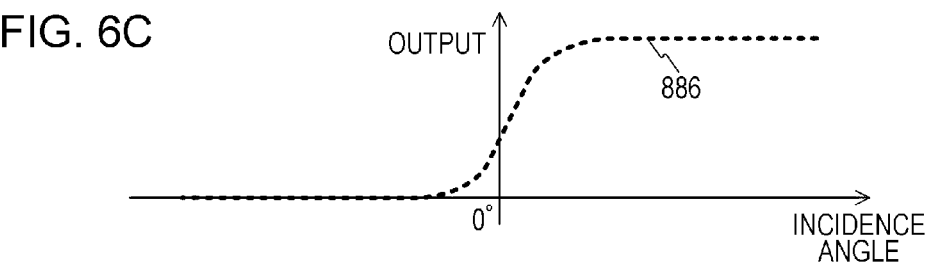

In FIG. 6C, a characteristic of the right aperture phase difference detection pixel (right aperture phase difference detection pixel light sensing characteristic 886) disposed around the center of the image sensor according to the embodiment of the present disclosure are denoted by the broken line. The graph shown in FIG. 6C in which the transverse axis expresses an incidence angle of light incident to the micro lens 884 of the right aperture phase difference detection pixel 880, and the longitudinal axis expresses an output of a signal generated by the light sensing element 883, indicates the right aperture phase difference detection pixel light sensing characteristic 886.

FIG. 6C is the same as FIG. 6B except that a sensed subject light side and a blocked subject light side are opposite to those in the left aperture phase difference detection pixel light sensing characteristic 896 shown in FIG. 6B, and thus description thereof will be omitted. In other words, the right aperture phase difference detection pixel light sensing characteristic 886 indicates that, using subject light with the incidence angle of "0°" as a boundary line, subject light with an incidence angle smaller than "0°" is blocked, and subject light with an incidence angle greater than "0°" is sensed.

Figure 6D:
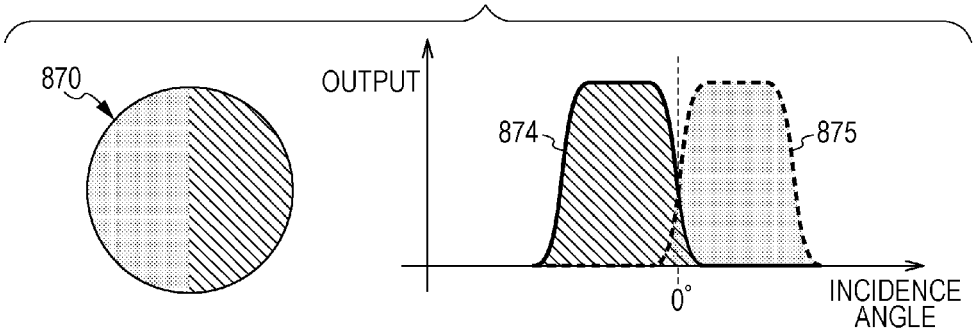

FIG. 6D schematically shows light sensed by a pair of phase difference detection pixels (the left aperture phase difference detection pixel 890 and the right aperture phase difference detection pixel 880) disposed at the on-axis position using the exit pupil and the graph.

In the exit pupil (exit pupil 870) shown in FIG. 6D, the region through which subject light sensed by the left aperture phase difference detection pixel 890 passes is indicated by a gray region. In addition, in the exit pupil 870, the region through which subject light sensed by the right aperture phase difference detection pixel 880 passes is indicated by a dotted region.

The graph shown in FIG. 6D represents a left aperture phase difference detection pixel light sensing characteristic 874 indicating subject light sensed by the left aperture phase difference detection pixel 890 and a right aperture phase difference detection pixel light sensing characteristic 875 indicating subject light sensed by the right aperture phase difference detection pixel 880. In addition, in this graph, the area corresponding to light sensed by the left aperture phase difference detection pixel 890 is indicated by a gray region, and the area corresponding to light sensed by the right aperture phase difference detection pixel 880 is indicated by a dotted region.

As shown in the graph of FIG. 6D, using subject light (main light beam) with an incidence angle of "0°" as a boundary line, subject light with an incidence angle from the right end of the exit pupil to the main light beam is sensed by the left aperture phase difference detection pixel, and subject light with an incidence angle from the main light beam to the left end is sensed by the right aperture phase difference detection pixel. In addition, a width (the left and the right end of the exit pupil) of the angle of subject light sensed by the left aperture phase difference detection pixel and the left aperture phase difference detection pixel is determined depending on a size of the exit pupil and the distance between the light sensing surface and the exit pupil.

Here, a case is assumed in which a replacement lens where the F-number is "5.6" is installed in the imaging apparatus, and a width of the angle of the subject light incident to the micro lens is 10°. In this case, the left aperture phase difference detection pixel 890 senses subject light with an incidence angle of "−5° to 0°". On the other hand, the right aperture phase difference detection pixel 880 senses subject light with an incidence angle of "0° to 5°". In addition, in a case in which a replacement lens with the F-number of "1.4" is installed and a width of the angle of subject light incident to the micro lens is "40°", the left aperture phase difference detection pixel 890 senses subject light with an incidence angle of "−20° to 0°". On the other hand, the right aperture phase difference detection pixel 880 senses subject light with an incidence angle of "0° to 20°".

As such, in the phase difference detection pixels disposed around the center of the image sensor according to the embodiment of the present disclosure, pupil division is performed using subject light with an incidence angle of "0°" to the micro lens as a boundary line.

Next, characteristics of phase difference detection pixels disposed at the off-axis position (a position deviated from the on-axis position in the image sensor) will be described with reference to FIGS. 7A to 7C.

Example of Characteristics of Off-Axis Phase Difference Detection Pixels

Figure 7A:
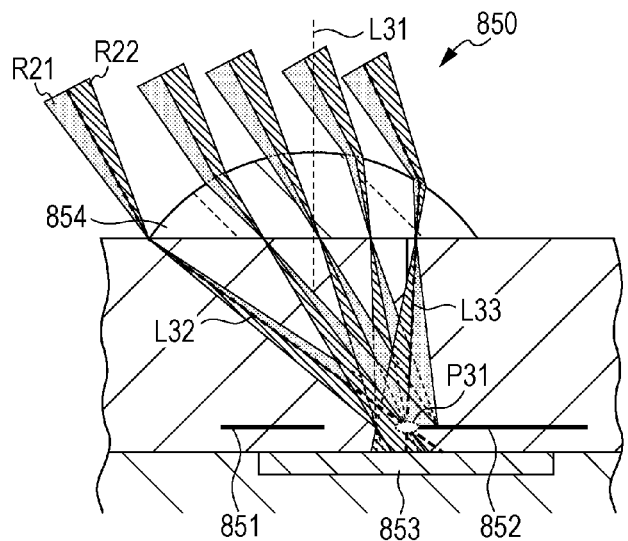
FIGS. 7A to 7C are diagrams schematically illustrating subject light sensed by a phase difference detection pixel disposed at an off-axis position of the image sensor according to the embodiment of the present disclosure, graphs indicating characteristics of the phase difference detection pixel, and a graph indicating subject light sensed by the phase difference detection pixel.
Figure 7B:
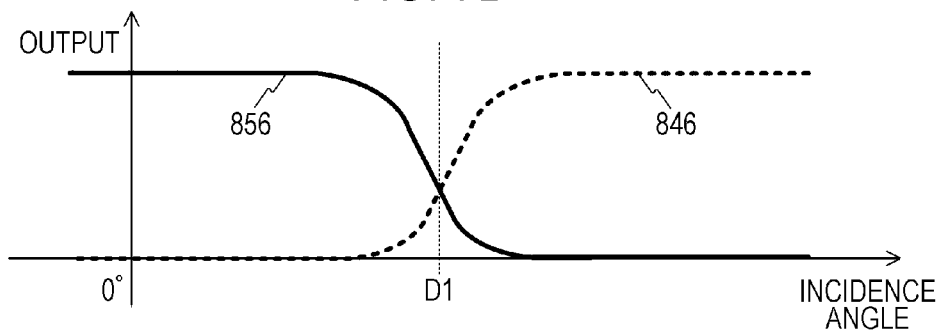
Figure 7C:
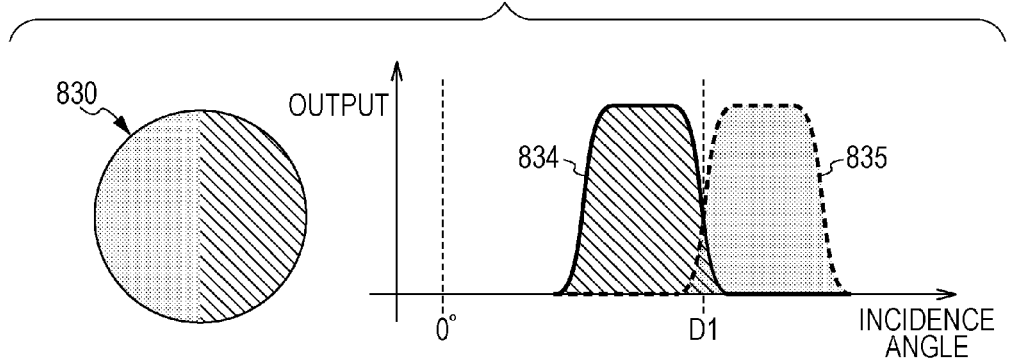

FIGS. 7A to 7C are diagrams schematically illustrating subject light sensed by a phase difference detection pixel disposed at the off-axis position of the image sensor according to the embodiment of the present disclosure, a graph indicating characteristics of the phase difference detection pixel, and a graph indicating subject light sensed by the phase difference detection pixel.

FIG. 7A schematically shows a cross-sectional configuration of a left aperture phase difference detection pixel 850 disposed at the off-axis position of the image sensor according to the embodiment of the present disclosure, and subject light incident to the phase difference detection pixel 850. FIG. 7A shows a light sensing element 853, a light blocking layer 851, a light blocking layer 852, and a micro lens 854 as the cross-sectional configuration of the left aperture phase difference detection pixel 850.

In addition, in the cross-sectional configuration of the left aperture phase difference detection pixel 850, in the same manner as FIG. 6A, a portion of the subject light passing through the right half region of the exit pupil is indicated by gray regions (for example, a region R22). Further, a portion of subject light passing through the left half of the exit pupil is indicated by dotted regions (for example, a regions R21). In addition, in the left aperture phase difference detection pixel 850, broken lines (broken lines L32 and L33) corresponding to the broken lines L22 and L23 in FIG. 6A, an optical axis L31 corresponding to the optical axis L21, and a main light beam image forming point P31 corresponding to the main light beam image forming point P21.

As shown in the left aperture phase difference detection pixel 850, subject light is obliquely incident in the phase difference detection pixel disposed at the off-axis position. For this reason, a position of the image forming point of the main light beams (the main light beam image forming point P31) also becomes distant from the optical axis (optical axis L31) of the micro lens. Therefore, in the phase difference detection pixel disposed at the off-axis position, the micro lens, the light blocking layers, and the light sensing element are disposed such that a position of the main light beam image forming point P31 is aligned with a position of the end portion of the light blocking layer for pupil division on the entrance side.

FIG. 7B shows characteristics of a pair of phase difference detection pixels (a left aperture phase difference detection pixel 856 and a right aperture phase difference detection pixel 846) around at the off-axis position of the image sensor according to the embodiment of the present disclosure. In addition, the graph shown in FIG. 7B corresponds to the graphs shown in FIGS. 6B and 6C, and thus detailed description thereof will be omitted here.

As shown in FIG. 7B, in a pair of phase difference detection pixels disposed around the off-axis position, subject light with an incidence angle greater than "0°" forms a boundary line (the broken line D1 in the graph). For example, in a case of a position where an angle of the main light beam is "15°" (the position F4 in FIG. 5A), the left aperture phase difference detection pixel senses subject light with an incidence angle smaller than "15°" and does not sense subject light with an incidence angle greater than "15°". On the other hand, the right aperture phase difference detection pixel senses subject light with an incidence angle greater than "15°" and does not sense subject light with an incidence angle smaller than "15°".

FIG. 7C schematically shows light sensed by a pair of phase difference detection pixels disposed at the off-axis position using the exit pupil and the graph. Further, the ones shown in FIG. 7C correspond to those shown in FIG. 6D, and thus differences with FIG. 6D will be described here.

In the exit pupil 830 shown in FIG. 7C, in the same manner as the exit pupil 870 shown in FIG. 6D, the dotted region and the gray region are adjacent to each other in the horizontal direction (pupil division direction) of the line passing through the center of the exit pupil. In other words, FIG. 7C shows that the left aperture phase difference detection pixel senses subject light passing through the right half region of the exit pupil, and the right aperture phase difference detection pixel senses subject light passing through the right half region of the exit pupil.

The graph shown in FIG. 7C represents characteristics indicating subject light sensed by a pair of phase difference detection pixels disposed at the off-axis position (a left aperture phase difference detection pixel light sensing characteristic 834 and a right aperture phase difference detection pixel light sensing characteristic 835). In the graph shown in FIG. 7C, the position of the incidence angle "0°" is deviated further toward the left side than in the graph shown in FIG. 6D. In addition, in the graph of FIG. 7C, the incidence angle "0°" is located further at the left side than a range of the angle of the subject light sensed by the light sensing element of the left aperture phase difference detection pixel (a range of the angle where an output of the left aperture phase difference detection pixel light sensing characteristic 834 is generated).

In this way, in a pair of off-axis phase difference detection pixels, the left aperture phase difference detection pixel senses subject light with an angle from the right end of the exit pupil to the main light beam using subject light with a predetermined angle (an angle of the main light beam) as the boundary line (the broken line D1 in the graph). In addition, the left aperture phase difference detection pixel senses subject light with an angle from the main light beam to the left end of the exit pupil.

For example, in a case where a replacement lens with the F-number of "5.6" is installed in the imaging apparatus, at a position where an angle of the main light beam is "15°", the left aperture phase difference detection pixel senses subject light with an incidence angle of "10° to 15°". On the other hand, the right aperture phase difference detection pixel senses subject light with an incidence angle of "15° to 20°".

That is to say, as shown in FIG. 7C, the pupil division is performed using the main light beam which is obliquely incident to the micro lens as a boundary line, in the phase difference detection pixels disposed at the off-axis position of the image sensor according to the embodiment of the present disclosure.

As such, in the image sensor according to the embodiment of the present disclosure, the light blocking layers are disposed so as to be aligned with a position of the image forming point of the main light beams which are tilted according to the image height, and thereby it is possible to perform the pupil division where the exit pupil is equally divided into two at any image height.

However, vignetting is not considered in the image sensor according to the embodiment of the present disclosure. If a replacement lens in which the vignetting occurs is installed in the imaging apparatus, phase difference detection accuracy may be reduced. Therefore, the influence of the vignetting on the phase difference detection will be described with reference to FIGS. 8A to 9D.

Example of Vignetting

FIGS. 8A to 8E are schematic diagrams illustrating vignetting occurring in the imaging apparatus according to the embodiment of the present disclosure.

Figure 8A:
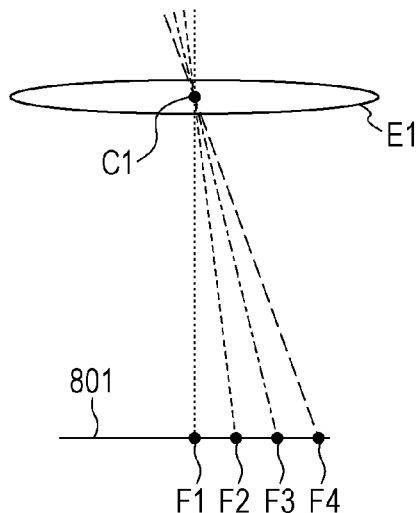
FIGS. 8A to 8E are schematic diagrams illustrating vignetting which is generated in the imaging apparatus according to the embodiment of the present disclosure.

FIG. 8A shows positions of the pixels (positions F1 to F5). In addition, FIGS. 8B to 8E show exit pupils where vignetting occurs at the respective positions F1 to F5. FIG. 8A is the same as FIG. 5A, and thus description thereof will be omitted here.

FIG. 8A shows an exit pupil (exit pupil E11) of the pixel at the position F1 (on-axis). As shown in the exit pupil E11, vignetting does not occur in the on-axis (position F1) pixel, and thus the exit pupil has the same shape as the shape (circular shape) of the lens.

Figure 8B:
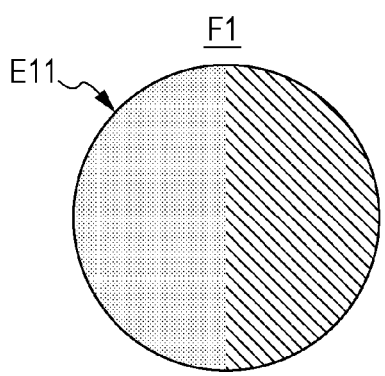
Figure 8C:
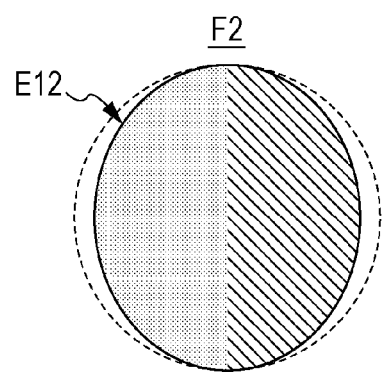
Figure 8D:
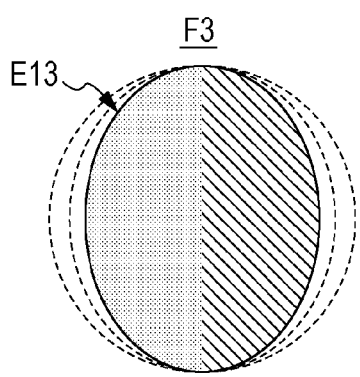
Figure 8E:
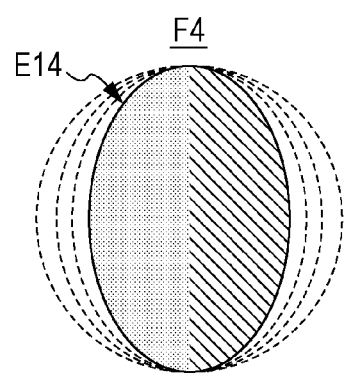

In FIG. 8B, the exit pupil in the pixel at the position F2 is denoted by the solid line (exit pupil E12). In addition, in FIG. 8C, the exit pupil in the pixel at the position F3 is denoted by the solid line (exit pupil E13), and in FIG. 8D, the exit pupil in the pixel at the position F4 is denoted by the solid line (exit pupil E14). Further, the shape of the exit pupil E11 is shown by the dotted lines in the exit pupil E12, the shapes of the exit pupils E11 and E12 are shown by the dotted lines in the exit pupil E13, and the shapes of the exit pupils E11 to E13 are shown by the dotted lines in the exit pupil E14.

Subject light which passes through the exit pupil (lens) and is incident to a pixel is increasingly eclipsed by frames or the like disposed on the front and rear sides of the diaphragm depending on a position of the pixel from the on-axis to the off-axis. For this reason, a shape of the exit pupil is varied from the circular shape to the elliptical shape depending on a position from the on-axis to the off-axis as shown in FIGS. 8B to 8E.

Example of Influence of Vignetting on Phase Difference Detection Characteristics FIGS. 9A to 9D are schematic diagrams illustrating the influence of vignetting which occurs in the image including the image sensor according to the embodiment of the present disclosure, on phase difference detection characteristics.

Figure 9A:
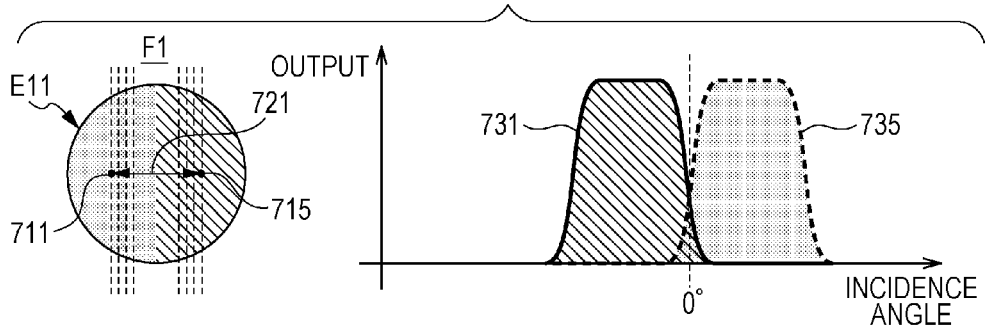
FIGS. 9A to 9D are schematic diagrams illustrating the influence of vignetting generated in the imaging apparatus provided with the image sensor according to the embodiment of the present disclosure, on phase difference detection characteristics.
Figure 9B:
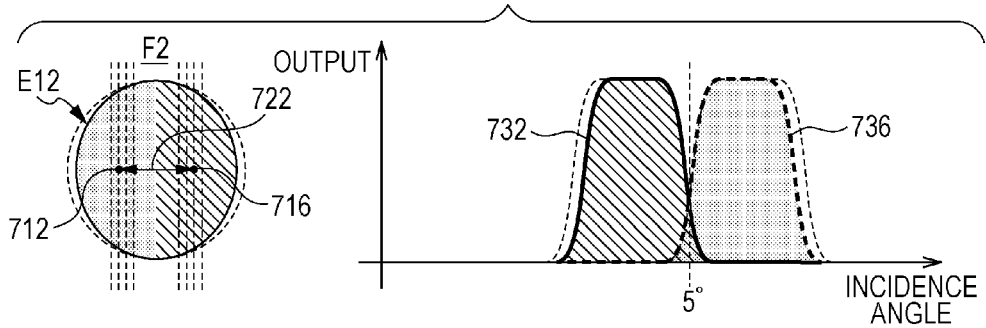
Figure 9C:
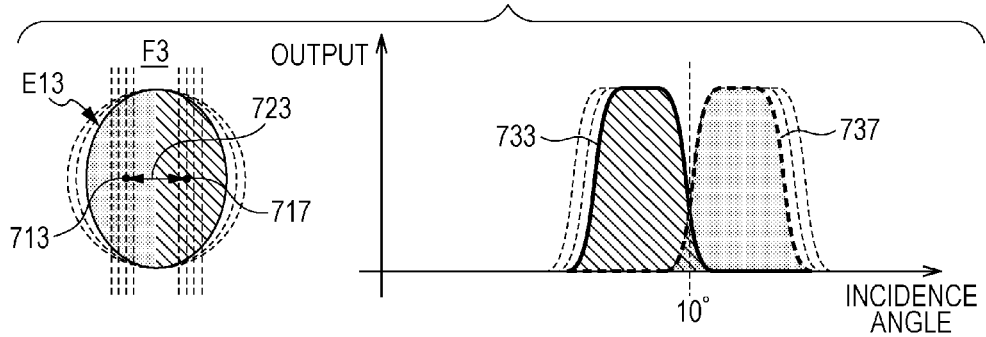
Figure 9D:
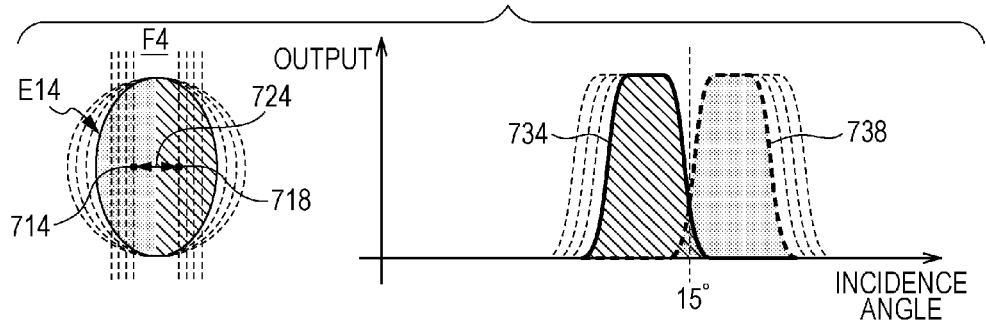

In the same figures, light sensing characteristics of the phase difference detection pixel at the positions F1 to F4 will be described assuming that vignetting occurs as shown in FIGS. 8A to 8E. In addition, FIG. 9A shows light sensing characteristics of a pair of phase difference detection pixels at the position F1, and FIG. 9B shows light sensing characteristics of a pair of phase difference detection pixels at the position F2. FIG. 9C shows light sensing characteristics of a pair of phase difference detection pixels at the position F3, and FIG. 9D shows light sensing characteristics of a pair of phase difference detection pixels at the position F4.

In the exit pupils E11 to E14 shown in FIGS. 9A to 9D, a shape of the exit pupil at each position (positions F1 to F4) is denoted by the solid line. In addition, in each of the exit pupils E11 to E14, a region (dotted region) through which subject light sensed by the right aperture phase difference detection pixel passes and a region (gray region) through which subject light sensed by the left aperture phase difference detection pixel passes are shown. Further, centroid positions (centroids 711 to 718) of the respective regions are shown in the exit pupils E11 to E14. Further, the shape of the exit pupil E11 is shown by the dotted lines in the exit pupil E12, the shapes of the exit pupils E11 and E12 are shown by the dotted lines in the exit pupil E13, and the shapes of the exit pupils E11 to E13 are shown by the dotted lines in the exit pupil E14.

In addition, an arrow (phase difference detection characteristic 721) which is a gap between the centroid 711 and the centroid 715 and indicates an extent of the phase difference detection characteristic is shown in the exit pupil E11. In the same manner, a phase difference detection characteristic 722 is shown in the exit pupil E12, a phase difference detection characteristic 723 is shown in the exit pupil E13, and a phase difference detection characteristic 724 is shown in the exit pupil E14.

Here, the phase difference detection characteristics will be described. The phase difference detection characteristics refer to accuracy (characteristics) when the focusing determination unit 183 detects a phase difference based on a signal of the phase difference detection pixel. In the phase difference detection pixel, if a subject light division extent (accuracy) is increased, the distance between centroids of a pair of images becomes wide. Thereby, a misalignment amount of images is finely measured, and phase difference detection accuracy (characteristics) is improved.

In the graphs in FIGS. 9A to 9D, left aperture phase difference detection pixel light sensing characteristics (left aperture phase difference detection pixel light sensing characteristics 731 to 734) and right aperture phase difference detection pixel light sensing characteristics (right aperture phase difference detection pixel light sensing characteristics 735 to 738) at the respective positions are shown. In addition, light sensing characteristics at the position F1 are shown by the thin dotted lines in the graph of FIG. 9B, light sensing characteristics at the positions F1 and F2 are shown by the thin dotted lines in the graph of FIG. 9C, and light sensing characteristics at the positions F1 to F3 are shown by the thin dotted lines in the graph of FIG. 9D. In the graphs shown in the same figures, subject light sensed by the left aperture phase difference detection pixel is schematically indicated by the gray region, and subject light sensed by the right aperture phase difference detection pixel is schematically indicated by the dotted region.

Here, there will be made a description of a characteristic difference between the on-axis phase difference detection pixel and the off-axis phase difference detection pixel in a case where vignetting occurs.

As shown in the exit pupils E11 to E14, if vignetting occurs, the exit pupil becomes smaller according to an increase in the image height. That is to say, an angle range of subject light incident to the phase difference detection pixel is reduced according to an increase in the image height. For example, subject light with a smaller incidence angle is not sensed by the left aperture phase difference detection pixel as indicated by the left aperture phase difference detection pixel light sensing characteristics 731 to 734. Subject light with a greater incidence angle is not sensed by the right aperture phase difference detection pixel as indicated by the right aperture phase difference detection pixel light sensing characteristics 735 to 738. In other words, subject light with an angle becoming distant from the angle of the main light beam is not sensed by the phase difference detection pixels in a case where the vignetting occurs.

If the subject light with an angle becoming distant from the angle of the main light beam is not sensed due to the vignetting, a centroid position of the subject light sensed by the phase difference detection pixel is moved to the angle side of the main light beam (refer to the centroids 711 to 718). Thereby, the distance between the centroids is shortened, and the phase difference detection characteristics are deteriorated (a centroid gap is shortened toward the outermost off-axis (position F4) as indicated by the phase difference detection characteristics 721 to 724).

As such, in the image sensor according to the embodiment of the present disclosure, the phase difference detection pixel located at the on-axis position and the phase difference detection pixel located at the off-axis position represent different phase difference detection characteristics. Thereby, upon comparison of a case of performing phase difference detection using an output of the on-axis phase difference detection pixel with a case of performing phase difference detection using an output of the off-axis phase difference detection pixel, phase difference detection accuracy is deteriorated in the case of performing phase difference detection using an output of the off-axis phase difference detection pixel.

Therefore, in a phase difference detection pixel according to the first embodiment of the present disclosure, the difference between the phase difference detection characteristics of the on-axis phase difference detection pixel and the phase difference detection characteristics of the off-axis phase difference detection pixel is alleviated. Next, the phase difference detection pixel according to the first embodiment of the present disclosure will be described with reference to FIGS. 10A to 12D.

Figure 10A:
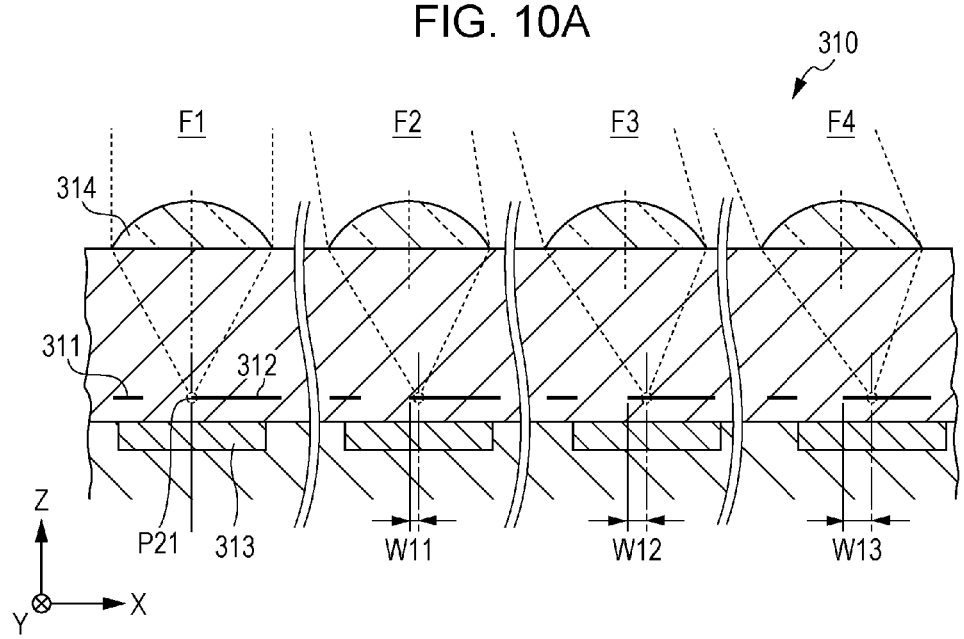
FIGS. 10A and 10B are schematic diagrams illustrating an example of the position of the light blocking layer at each image height in the second image sensor according to the first embodiment of the present disclosure.
Figure 10B:
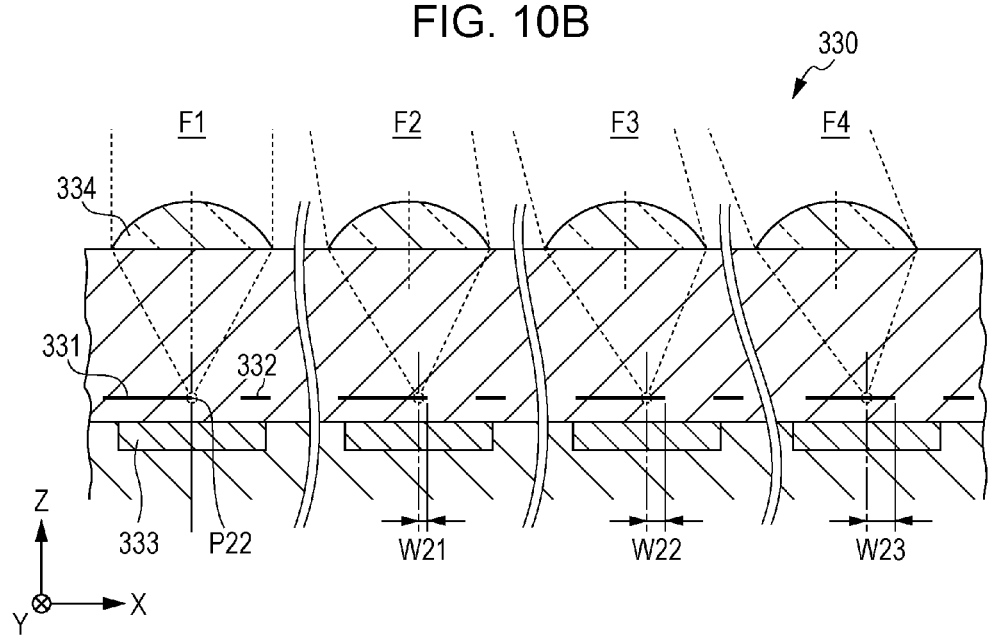

Example of Position of Light Blocking Layer at Each Image Height in Second Image Sensor FIGS. 10A and 10B are schematic diagrams illustrating an example of the position of the light blocking layer at each image height in the second image sensor 200 according to the first embodiment of the present disclosure. In addition, in the same figures, for convenience of description, the W filter of the phase difference detection pixel is not shown.

FIG. 10A shows cross-sectional configurations of the left aperture phase difference detection pixels and image forming points of the main light beams by the micro lenses of the left aperture phase difference detection pixels at the four positions (positions corresponding to the positions F1 to F4 in FIG. 5A) of the second image sensor 200. FIG. 10A shows light blocking layers 311 and 312, a light sensing element 313, and a micro lens 314 as the cross-sectional configuration of the left aperture phase difference detection pixel. In addition, light beams passing through the left end and the right end of the micro lens 314 of the main light beams incident to the micro lens 314 are indicated by the broken lines which pass through the image forming point from the micro lens 314. In addition, the image forming point (main light beam image forming point P21) of the main light beams incident to the micro lens 314 is shown at a position where the broken lines intersect each other in the cross-sectional configuration of each left aperture phase difference detection pixel.

In the left aperture phase difference detection pixel 310 at the positions F2 to F4 shown in FIG. 10A, widths (widths W11 to W13) indicating gaps between the position of the image forming point of the main light beams and the position of the end portion of the light blocking layer on the entrance side 312 are shown.

In addition, the cross-sectional configuration shown in FIG. 10A corresponds to the cross-sectional configuration of the left aperture phase difference detection pixel of the image sensor according to the embodiment of the present disclosure shown in FIG. 5B. Therefore, in FIG. 10A, attention is paid to the difference between the image sensor according to the embodiment of the present disclosure and the second image sensor according to the embodiment of the present disclosure, and the difference will be described.

In the left aperture phase difference detection pixel 310 at the position F1 shown in FIG. 10A, the position of the left end of the light blocking layer 312 corresponds with the position of the image forming point of the main light beam (main light beam image forming point P21). In the left aperture phase difference detection pixel 310 at the position F2 which is located further at the off-axis position than the position F1, the position of the left end of the light blocking layer 312 slightly protrudes further leftward (by the width W11) than the position of the image forming point of the main light beams (the position of the end portion of the entrance side becomes distant).

In addition, in the left aperture phase difference detection pixel 310 at the position F3 which is located further at the off-axis position than the position F2, the position of the left end of the light blocking layer 312 protrudes still further leftward (by the width W12 from the image forming point of the main light beams) than the position of the left end of the light blocking layer 312 of the left aperture phase difference detection pixel 310 at the position F2. That is to say, in the left aperture phase difference detection pixel 310 at the position F3, the position of the end portion of the light blocking layer on the entrance side 312 becomes distant from the image forming point of the main light beams more than the light blocking layer 312 of the left aperture phase difference detection pixel 310 at the position F2.

In the same manner, in the left aperture phase difference detection pixel 310 at the position F4 which is located further at the off-axis position than the position F3, the position of the left end of the light blocking layer 312 protrudes still further leftward (by the width W13 from the image forming point of the main light beams) than the position of the left end of the light blocking layer 312 of the left aperture phase difference detection pixel 310 at the position F3. In other words, in the left aperture phase difference detection pixel 310 at the position F4, the position of the end portion of the light blocking layer on the entrance side 312 becomes distant from the image forming point of the main light beams more than the light blocking layer 312 of the left aperture phase difference detection pixel 310 at the position F3. That is to say, the light blocking layer 312 is set such that the left end of the light blocking layer 312 becomes distant from the position of the image forming point of the main light beams leftward (one of the pupil division directions) according to an increase in the image height.

In this way, in the left aperture phase difference detection pixel according to the first embodiment of the present disclosure, the left end (the end portion on the entrance side) of the light blocking layer (light blocking layer 312) for blocking light in order to perform pupil division for the right side of the subject light collected by the micro lens, is set so as to become distant from the image forming point of the main light beams according to an increase in the image height.

On the other hand, in the left aperture phase difference detection pixel of the image sensor according to the embodiment of the present disclosure, as shown in FIG. 5B, the position of the left end of the light blocking layer (light blocking layer 892) is made to correspond with the position of the image forming point of the main light beams (main light beam image forming point P11) regardless of the image height.

FIG. 10B shows a cross-sectional configuration of the right aperture phase difference detection pixel and an image forming point of the main light beams by the micro lens of the left aperture phase difference detection pixel at the four positions (positions F1 to F4 in FIG. 5A) of the second image sensor 200. In FIG. 10B, as a cross-sectional configuration of each left aperture phase difference detection pixel, light blocking layers 331 and 332, a light sensing element 333, and a micro lens 334 are shown. In addition, in the same manner as FIG. 10A, broken lines and image forming points of the main light beams (main light beam image forming point P22) are shown.

In the right aperture phase difference detection pixel 330 at the positions F2 to F4 shown in FIG. 10B, widths (widths W21 to W23) indicating gaps between the position of the image forming point of the main light beams and the position of the end portion of the light blocking layer 331 on the entrance side are shown.

In the right aperture phase difference detection pixel 330 at the position F1 shown in FIG. 10B, the position of the right end of the light blocking layer 331 corresponds with the position of the image forming point of the main light beam (main light beam image forming point P22). In the right aperture phase difference detection pixel 330 at the position F2 which is located further at the off-axis position than the position F1, the position of the right end of the light blocking layer 331 slightly protrudes further leftward (by the width W21) than the position of the image forming point of the main light beams (the position of the end portion on the entrance side becomes distant from the position of the image forming point of the main light beams). In addition, the light blocking layer 331 of the right aperture phase difference detection pixel 330 at the position F3 protrudes still further leftward (by the width W22 from the image forming point of the main light beams) than the light blocking layer 331 of the right aperture phase difference detection pixel 330 at the position F2. In the same manner, the light blocking layer 331 of the right aperture phase difference detection pixel 330 at the position F4 protrudes still further leftward (by the width W23 from the image forming point of the main light beams) than the light blocking layer 331 of the right aperture phase difference detection pixel 330 at the position F3. That is to say, the light blocking layer 331 is set such that the right end of the light blocking layer 331 becomes distant from the position of the image forming point of the main light beams rightward (the other of the pupil division directions) according to an increase in the image height.

In this way, in the right aperture phase difference detection pixel according to the first embodiment of the present disclosure, the right end (the end portion on the entrance side) of the light blocking layer (light blocking layer 331) for blocking light in order to perform pupil division for the left side of the subject light collected by the micro lens, is set so as to become distant from the image forming point of the main light beams according to an increase in the image height.

The widths W21 and W11 shown in FIGS. 10A and 10B are the same length. In a similar manner, the widths W22 and W12 are the same length, and the widths W23 and W13 are the same length. That is to say, in a pair of phase difference detection pixels (the left aperture phase difference detection pixel and the right aperture phase difference detection pixel at the same height), the distance between the position of the end portion of the light blocking layer for pupil division on the entrance side and the position of the image forming point of the main light beams is the same distance in the pair of phase difference detection pixels.

In addition, in a pair of phase difference detection pixels, an overlapping region between the region where light is blocked from reaching the light sensing element 313 of the left aperture phase difference detection pixel by the light blocking layer 312 and the region where light is blocked from reaching the light sensing element 333 of the right aperture phase difference detection pixel by the light blocking layer 331, is increased according to an increase in the image height.

As such, in the phase difference detection pixels of the second image sensor 200 according to the first embodiment of the present disclosure, the end portion of the light blocking layers (light blocking layers 311 and 331) on the entrance side are set so as to become distant from the image forming point of the main light beams according to an increase in the image height. In addition, the micro lenses 314 and 334 are an example of the micro lens recited in the claims, the light sensing elements 313 and 333 are an example of the light sensing element recited in the claims, and the light blocking layers 312 and 332 are an example of the light blocking portion recited in the claims.

In addition, although, in the same figures, a case where the light blocking layer 311 is also moved so as to be suitable for the position of the light blocking layer 312 and the distance between the light blocking layers 311 and 312 is constant (this is also the same for the distance between the light blocking layers 331 and 332) regardless of the image height has been described, the present disclosure is not limited thereto. The light blocking layer 311 may be disposed at any position which does not hinder one part of pupil-divided subject light from being sensed (this is also the same for the light blocking layer 332). Therefore, for example, the light blocking layers 311 and 332 may be set so as to be located at a constant position with respect to the light sensing element as in the light blocking layers 891 and 882 in FIGS. 5A to 5C. In addition, in this case, although the aperture area is decreased according to the image height, since the light blocking layers are disposed at positions which do not hinder subject light from being sensed by the light sensing element, there is no problem.

Next, an effect achieved by separating a position of the end portion of the light blocking layer on the entrance side from a position of the image forming point of the main light beams will be described with reference to FIGS. 11A to 11C assuming that a position of the end portion of the light blocking layer on the entrance side of the left aperture phase difference detection pixel at the position F1 (on-axis) from a position of the image forming point of the main light beams.

Figure 11A:
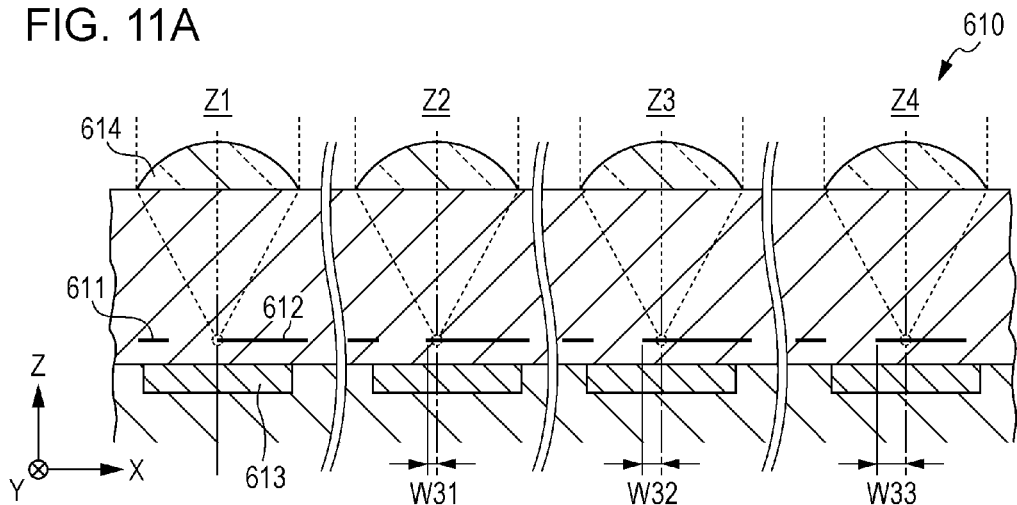
FIGS. 11A to 11C are diagrams schematically illustrating subject light sensed by a left aperture phase difference detection pixel in a case where a position of the end portion of the light blocking layer on the entrance side of the on-axis left aperture phase difference detection pixel is separated from a position of the image forming point of the main light beam.
Figure 11B:
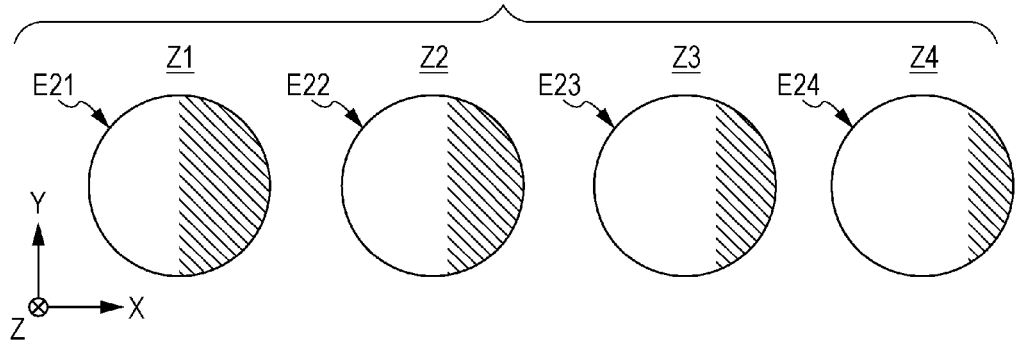
Figure 11C:
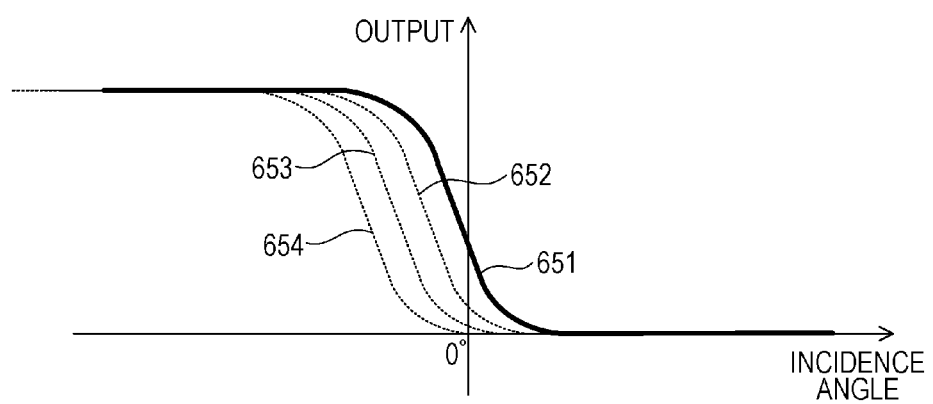

Example of Effect Achieved by Separating Light Blocking Layer from Position of Image Forming Point in on-Axis Left Aperture Phase Difference Detection Pixel FIGS. 11A to 11C are schematically diagrams illustrating subject light sensed by the left aperture phase difference detection pixel in a case where a position of the end portion on the entrance side of the on-axis left aperture phase difference detection pixel is separated from a position of the image forming point of the main light beams.

FIG. 11A shows a cross-sectional configuration in a case where a position of the end portion of the light blocking layer on the entrance side for pupil division of the left aperture phase difference detection pixel at the on-axis position (position corresponding to the position F1 in FIG. 5A) is separated from a position of the image forming point of the main light beams. In FIG. 11A, the left aperture phase difference detection pixel where the end portion of the light blocking layer corresponds with the position of the image forming point is shown at first on the left side, and three left aperture phase difference detection pixels are sequentially shown rightward in a case where the position of the light blocking layer is moved by the widths W31 to W33. In FIG. 11A, the four left aperture phase difference detection pixels are differentiated from each other using the signs Z1, Z2, Z3, and Z4.

The respective widths W31 to W33 shown in the same figure are the same as the widths W11 to W13 shown in FIG. 10A. That is to say, the four left aperture phase difference detection pixels (Z1 to Z4) respectively correspond to the left aperture phase difference detection pixels at the four positions (positions F1 to F4) shown in FIG. 10A except that angles of the main light beam are different.

In addition, a cross-sectional configuration of the left aperture phase difference detection pixel 610 (light blocking layers 611 and 612, a light sensing element 613, and a micro lens 614) shown in FIG. 11A is the same as the cross-sectional configuration shown in FIG. 10A, and thus description thereof will be omitted.

As shown in FIG. 11A, description will be made assuming that a position of the left end of the light blocking layer 612 is located further on the left side than a position of the image forming point according to an increase in the image height (the end portion of the entrance side is separated) in the same figure.

In FIG. 11B, regions (gray regions in the exit pupils E21 to E24) through which light sensed by the left aperture phase difference detection pixels (Z1 to Z4) passes are shown in the exit pupils (exit pupils E21 to E24) of the left aperture phase difference detection pixels (Z1 to Z4) shown in FIG. 11A. Since the positions of the four left aperture phase difference detection pixels (Z1 to Z4) are the same in the image sensor, shapes of the exit pupils E21 to E24 are circular shapes. The four left aperture phase difference detection pixels (Z1 to Z4) are different from each other in a misalignment extent of the position of the end portion of the light blocking layer on the entrance side (light blocking layer 612) from the position of the image forming point of the main light beams, and thus extents blocking subject light passing through the central side of the exit pupil in the pupil division direction (horizontal direction) are different from each other.

As shown in FIG. 11B, an extent blocking subject light passing through the central side of the exit pupil is increased as the position of the end portion of the light blocking layer on the entrance side (light blocking layer 612) becomes distant from the position of the image forming point of the main light beams (from Z1 to Z4).

FIG. 11C shows respective characteristics of the four phase difference detection pixels (Z1 to Z4) shown in FIG. 11A. In addition, the characteristic of the left aperture phase difference detection pixel (Z1) (left aperture phase difference detection pixel light sensing characteristic (Z1) 651) are the same as the left aperture phase difference detection pixel light sensing characteristic 896 shown in FIG. 6B, and thus description thereof will be omitted here.

The characteristic of the left aperture phase difference detection pixel (Z2) (left aperture phase difference detection pixel light sensing characteristic (Z2) 652) is a characteristic where the left aperture phase difference detection pixel light sensing characteristic (Z1) 651 is slightly shifted to the left. In addition, the characteristic of the left aperture phase difference detection pixel (Z3) (left aperture phase difference detection pixel light sensing characteristic (Z3) 653) is a characteristic where the left aperture phase difference detection pixel light sensing characteristic (Z2) 652 is slightly shifted to the left. In a similar manner, the characteristic of the left aperture phase difference detection pixel (Z4) (left aperture phase difference detection pixel light sensing characteristic (Z4) 654) is a characteristic where the left aperture phase difference detection pixel light sensing characteristic (Z3) 653 is slightly shifted to the left.

In this way, in the phase difference detection pixel, the position of the end portion of the light blocking layer on the entrance side 612 is shifted (separated) to the left from the position of the image forming point of the main light beams, and thereby it is possible to shift an angle of the boundary line of subject light which is incident to the light sensing element and subject light which is not incident to the light sensing element.

That is to say, in the left aperture phase difference detection pixel, the position of the left end of the light blocking layer blocking light for pupil division is shifted (protrudes) further to the left than the position of the image forming point of the main light beams, and thereby it is possible to decrease an incidence angle of the boundary line between sensed light and blocked light as compared with a case where the position is not shifted. In addition, in the right aperture phase difference detection pixel, the position of the right end of the light blocking layer blocking light for pupil division is shifted (protrudes) further to the right than the position of the image forming point of the main light beams, and thereby it is possible to increase an incidence angle of the boundary line between sensed light and blocked light as compared with a case where the position is not shifted.

As such, by shifting the position of the end portion on the entrance side of the light blocking layer blocking light for pupil division from the position of the image forming point of the main light beams, it is possible to shift an incidence angle of light of the boundary line between sensed light and blocked light from an angle of the image forming point of the main light beams according to image height.

Example of Effect Achieved by Separating Light Blocking Layer from Position of Image Forming Point According to Image Height FIGS. 12A to 12D are diagrams schematically illustrating subject light sensed by a pair of phase difference detection pixels at four image heights in the second image sensor 200 according to the first embodiment of the present disclosure, using exit pupils and graphs.

Figure 12A:
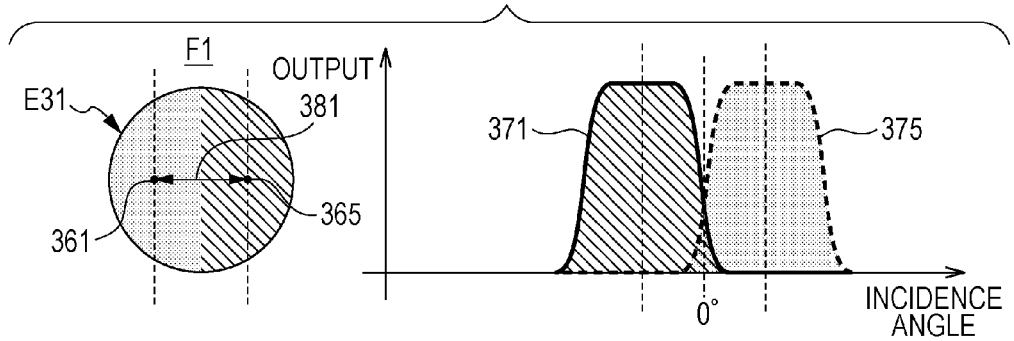
FIGS. 12A to 12D are diagrams schematically illustrating subject light sensed by a pair of phase difference detection pixels at four image heights in the second image sensor according to the first embodiment of the present disclosure, using exit pupils and graphs.
Figure 12B:
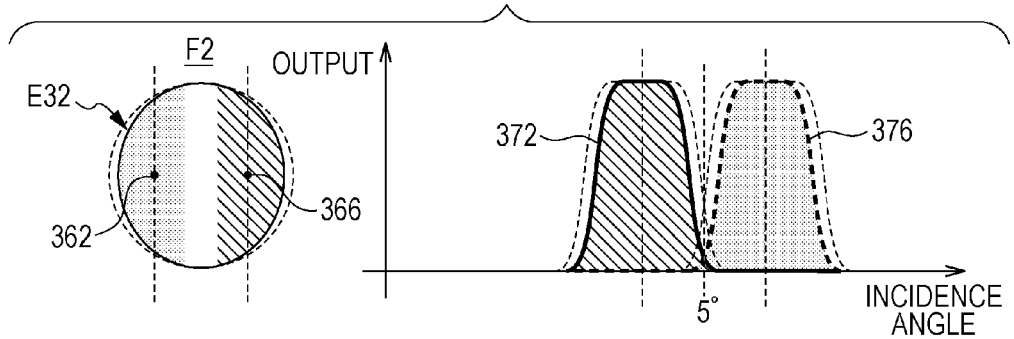
Figure 12C:
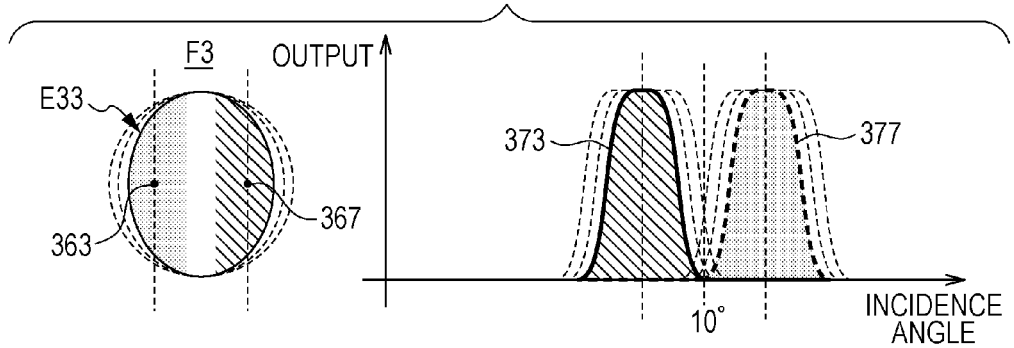
Figure 12D:
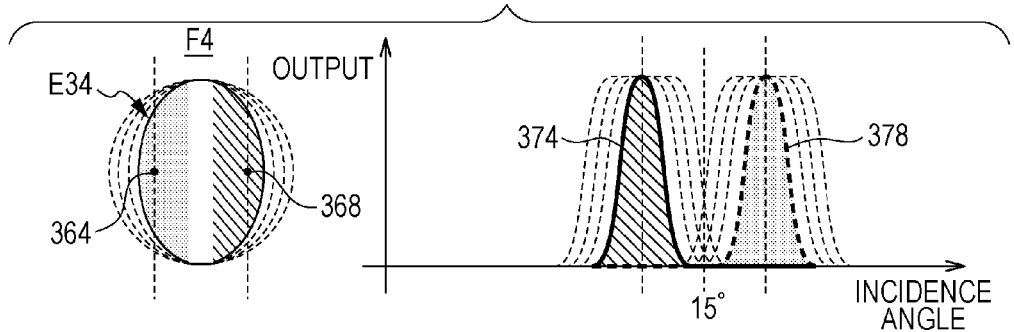

In the same figures, light sensing characteristics of a pair of phase difference detection pixels at four positions (positions corresponding to the positions F1 to F4 in FIG. 5A) will be described assuming that vignetting occurs as shown in FIG. 8A to 8E. In addition, FIG. 12A shows light sensing characteristics of a pair of phase difference detection pixels at the position F1, and FIG. 12B shows light sensing characteristics of a pair of phase difference detection pixels at the position F2. FIG. 12C shows light sensing characteristics of a pair of phase difference detection pixels at the position F3, and FIG. 12D shows light sensing characteristics of a pair of phase difference detection pixels at the position F4.

In the exit pupils E31 to E34 shown in FIGS. 12A to 12D, a shape of the exit pupil at each position (positions F1 to F4) is denoted by the solid line. In addition, in each of the exit pupils E31 to E34, a region through which subject light sensed by the right aperture phase difference detection pixel passes is denoted by the dotted region and a region through which subject light sensed by the left aperture phase difference detection pixel passes is denoted by a gray region. Further, centroid positions (centroids 361 to 368) of the respective regions are shown in the regions. Further, the shape of the exit pupil E31 is shown by the dotted lines in the exit pupil E32, the shapes of the exit pupils E31 and E32 are shown by the dotted lines in the exit pupil E33, and the shapes of the exit pupils E31 to E33 are shown by the dotted lines in the exit pupil E34.

In the graphs in FIGS. 12A to 12D, left aperture phase difference detection pixel light sensing characteristics (left aperture phase difference detection pixel light sensing characteristics 371 to 374) and right aperture phase difference detection pixel light sensing characteristics (right aperture phase difference detection pixel light sensing characteristics 375 to 378) at the respective positions are shown. In addition, light sensing characteristics at the position F1 are shown by the thin dotted lines in the graph of FIG. 12B, light sensing characteristics at the positions F1 and F2 are shown by the thin dotted lines in the graph of FIG. 12C, and light sensing characteristics at the positions F1 to F3 are shown by the thin dotted lines in the graph of FIG. 12D.

Here, effects achieved by separating the light blocking layer for pupil division of the phase difference detection pixel according to the first embodiment of the present disclosure from the position of the image forming point of the main light beams according to an increase in image height will be described with reference to the same figures.

As shown in the exit pupils E31 to E34, if image height is increased, a shape of the exit pupil is varied from the circular shape to the elliptical shape due to vignetting. That is to say, in the left aperture phase difference detection pixel, subject light passing through the vicinity of the right end of the on-axis exit pupil (exit pupil E31) is decreased according to image height. In addition, in the right aperture phase difference detection pixel, subject light passing through the vicinity of the left end of the on-axis exit pupil (exit pupil E31) is decreased according to image height.

On the other hand, in the left aperture phase difference detection pixel, the left end of the light blocking layer blocking light for pupil division is shifted (separated) to the left from the position of the image forming point of the main light beams according to an increase in the image height. In addition, in the right aperture phase difference detection pixel, the right end of the light blocking layer blocking light for pupil division is shifted to the right from the position of the image forming point of the main light beams according to an increase in the image height. By shifting the light blocking layer, subject light of the main light beams on the image forming point side is decreased due to an increase in the image height in relation to subject light sensed by the left aperture phase difference detection pixel and the right aperture phase difference detection pixel.

Thereby, as shown in FIGS. 12A to 12D, the light blocking layer for pupil division further protrudes than the position of the image forming point of the main light beams in response to reduction in the subject light due to vignetting according to image height, and thereby it is possible to set a centroid position of subject light sensed by the phase difference detection pixel.

In other words, in the first embodiment of the present disclosure, centroid positions (centroids 361 to 364) of the subject light sensed by the left aperture phase difference detection pixel can be made to be constant with respect to the centroid positions of the exit pupils regardless of image height. In addition, centroid positions (centroids 365 to 368) of the subject light sensed by the right aperture phase difference detection pixel can be made to be constant with respect to the centroid positions of the exit pupils regardless of image height. Thereby, in the first embodiment of the present disclosure, it is possible to make the phase difference detection characteristics constant regardless of image height (refer to the phase difference detection characteristic 381 of FIG. 12A).

As such, according to the first embodiment of the present disclosure, the phase difference detection characteristics of the off-axis phase difference detection pixel can be made to be the same as the phase difference detection characteristics of the on-axis phase difference detection pixel. That is to say, according to the first embodiment of the present disclosure, characteristics of the phase difference detection pixels in the imaging apparatus can be improved. In addition, since the phase difference detection characteristics are the same as each other through conformity of the centroid positions, it is possible to improve the characteristics of the phase difference detection pixels in the imaging apparatus without blocking subject light wastefully in the phase difference detection pixels where the image height is close to the on-axis position.

2. Second Embodiment

In the first embodiment of the present disclosure, there has been made the description of an example where the light blocking layer for pupil division in the phase difference detection pixel further protrudes than the position of the image forming point of the main light beams, thereby matching the off-axis phase difference detection pixel with the on-axis phase difference detection pixel. In this example, there are expected cases or the like where since subject light sensed by the off-axis phase difference detection pixel is decreased, a light amount is deficient in the off-axis phase difference detection pixel.

Therefore, in order to alleviate the light amount deficiency in the off-axis phase difference detection pixel, phase difference detection characteristics at other positions may be matched with a phase difference detection characteristic of the outermost off-axis pixel in a case where the phase difference detection characteristics of the on-axis pixel have sufficiently high accuracy (the distance between centroids is sufficiently open). In the second embodiment of the present disclosure, an example where a phase difference detection characteristic of the outermost off-axis phase difference detection pixel is used as a reference will be described with reference to FIGS. 13A to 13C.

Figure 13A:
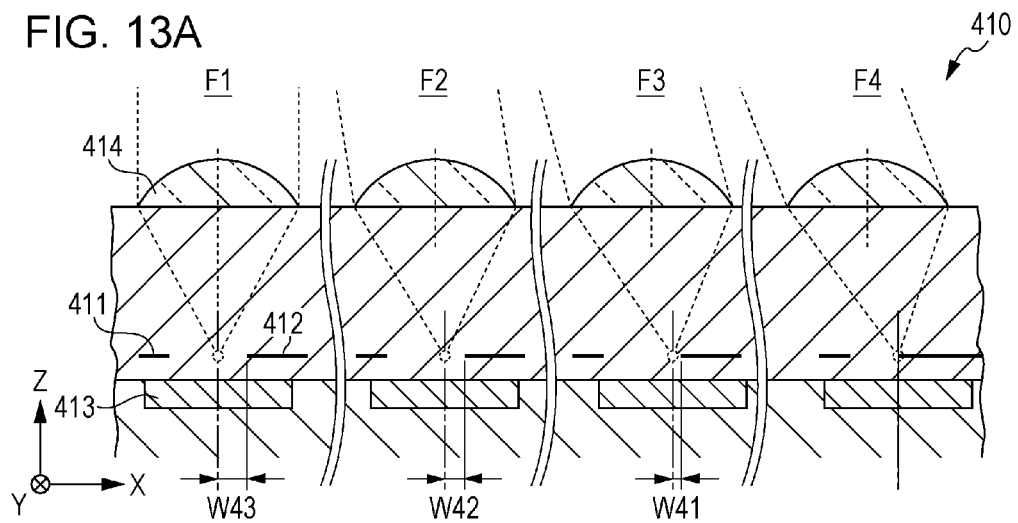
FIGS. 13A to 13C are schematic diagrams illustrating an example of the relationship between image height and a position of the light blocking layer in a second image sensor according to a second embodiment of the present disclosure.
Figure 13B:
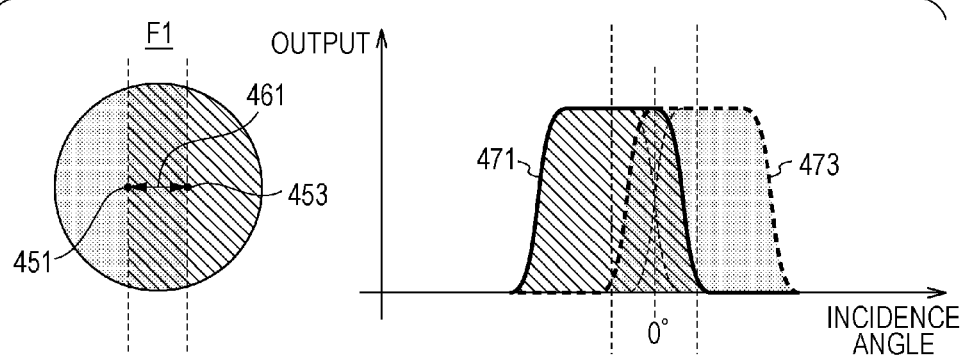
Figure 13C:
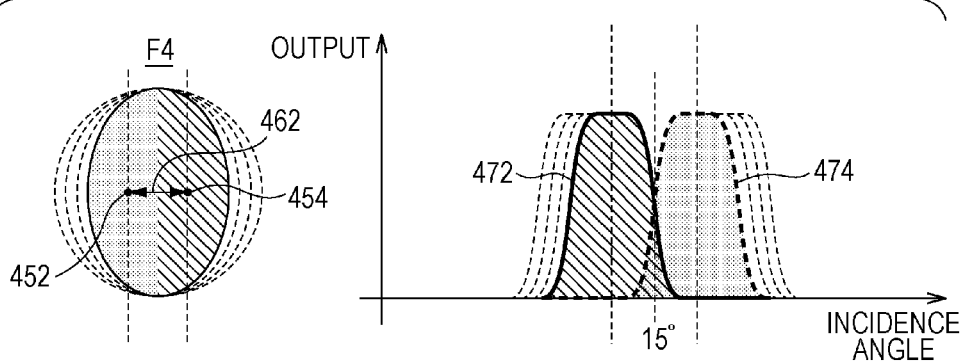

Example of Relationship Between Image Height and Light Blocking Layer in Second Image Sensor FIGS. 13A to 13C are schematic diagrams illustrating an example of the relationship between the image height and the light blocking layer in a second image sensor according to the second embodiment of the present disclosure.

FIG. 13A shows cross-sectional configurations of left aperture phase difference detection pixels and image forming points of the main light beams by micro lenses of the left aperture phase difference detection pixels at four positions (positions corresponding to the four positions F1 to F4 of FIG. 5A). The cross-sectional configurations in FIG. 13A correspond to the cross-sectional configurations of the left aperture phase difference detection pixels at four positions according to the first embodiment of the present disclosure, shown in FIG. 10A.

As shown in FIG. 13A, in the phase difference detection pixels according to the second embodiment of the present disclosure, the left end (the end portion on the entrance side) of the light blocking layer (light blocking layer 412) for pupil division corresponds with the position of the image forming point of the main light beams in the left aperture phase difference detection pixel located at the outermost off-axis position (position F4). In addition, according to a decrease in the image height, the left end of the light blocking layer 412 is set to become distant rightward from the position of the image forming point of the main light beams. Further, in the on-axis left aperture phase difference detection pixel, the left end of the light blocking layer 412 is set to be most distant from the position of the image forming point of the main light beams.

That is to say, in the phase difference detection pixels according to the second embodiment of the present disclosure, the left end of the light blocking layer (light blocking layer 412) for pupil division is set to be close to the position of the image forming point of the main light beams according to an increase in the image height. In addition, although not shown, in a right aperture phase difference detection pixel, the light blocking layers 411 and 412 of the left aperture phase difference detection pixel 410 are opposite to each other with respect to the position of the image forming point of the main light beams (refer to the relationships in FIGS. 10A and 10B). In other words, in the right aperture phase difference detection pixel, the right end of the light blocking layer for pupil division is set to be close to the position of the image forming point of the main light beams according to an increase in the image height.

FIGS. 13B and 13C schematically shows subject light sensed by a pair of phase difference detection pixels at the positions F1 and F4 using exit pupils and graphs assuming that vignetting occurs as shown in FIGS. 8B to 8E. In addition, FIG. 13B corresponds to FIG. 12A, and FIG. 13C corresponds to FIG. 12D.

As shown in FIG. 13B, in the second embodiment of the present disclosure, if the light blocking layer for pupil division becomes distant from the position of the image forming point of the main light beams, subject light blocked by the light blocking layer is decreased, and thus subject light sensed by the light sensing element is increased. The centroid of the subject light becomes close to the centroid of the exit pupil due to the increase in the sensed subject light (refer to the centroids 451 and 453 of FIG. 13B and the centroids 361 and 365 of FIG. 12A). That is to say, the light blocking layer for pupil division is set such that subject light sensed by the light sensing element of the phase difference detection pixel is increased, and thereby it is possible to set a centroid position of the subject light sensed by the phase difference detection pixel.

In other words, in the second embodiment of the present disclosure, in the same manner as the first embodiment of the present disclosure, a centroid position of subject light sensed by the phase difference detection pixel can be made to be constant with respect to a centroid position of the exit pupil regardless of image height. Thereby, the phase difference detection pixel can be made to be uniform regardless of image height.

As such, according to the second embodiment of the present disclosure, it is possible to make phase difference detection characteristics of the phase difference detection pixel at each image height the same as phase difference detection characteristics of the outermost off-axis phase difference detection pixel. That is to say, according to the second embodiment of the present disclosure, it is possible to improve characteristics of the phase difference detection pixels in the imaging apparatus.

In addition, although the phase difference detection characteristics of the on-axis phase difference detection pixel are used as a reference in the first embodiment of the present disclosure, and the phase difference detection characteristics of the outermost off-axis phase difference detection are used a reference in the second embodiment of the present disclosure, the present disclosure is not limited thereto. A phase difference detection characteristic of the phase difference detection pixel at a predetermined image height may be used as a reference. For example, in the phase difference detection pixel at a predetermined image height, a position of the end portion of the light blocking layer for pupil division on the entrance side is made to correspond with a position of the image forming point of the main light beams. In addition, in a phase difference detection pixel at a position lower than the predetermined image height, the light blocking layer for pupil division is disposed such that subject light sensed by the light sensing element is increased so as to be suitable for the image height (exit pupil shape) in the same manner as the second embodiment of the present disclosure. Further, in a phase difference detection pixel at a position higher than the predetermined image height, the light blocking layer for pupil division is disposed such that subject light sensed by the light sensing element is decreased so as to be suitable for the image height (exit pupil shape) in the same manner as the first embodiment of the present disclosure. Thereby, it is possible to make phase difference detection characteristics uniform regardless of image height in the same manner as the first and second embodiments of the present disclosure.

As such, according to the embodiments of the present disclosure, it is possible to improve characteristics of phase difference detection pixels in the imaging apparatus.

In addition, the imaging device according to an embodiment of the present disclosure can be manufactured simply by modifying a mask pattern when manufacturing metal layers (metal layers closest to the micro lens) which are light blocking layers into a mask pattern when manufacturing an imaging device in the related art. That is to say, the imaging device according to the embodiment of the present disclosure can be manufactured only with a simple modification of the process (modification of the mask pattern) in the manufacturing steps of the imaging device in the related art. In addition, structures other than the metal layers closest to the light sensing element are the same between the phase difference detection pixel and the image generation pixel, and thus it is possible to suppress non-uniformity of characteristics for the respective pixels in the phase difference detection pixel and the image generation pixel.

In addition, although, in the embodiments of the present disclosure, the phase difference detection pixel having light blocking layers for pupil division is assumed, the present disclosure is not limited thereto. For example, the present disclosure may be also applied to a case of a phase difference detection pixel where the light blocking layer for pupil division is not provided, a light sensing element is disposed at a position through which one part of pupil-divided subject light passes, and one part of pupil-divided subject light can be sensed. In this case, a position of the end portion of the light sensing element on the image forming point side of the main light beams is set to become distant from a position of the image forming point of the main light beams according to a variation in the image height. That is to say, a position of the boundary line (the end portion of the entrance side in a case of performing pupil division with the light blocking layer, and the end portion of the light sensing element on the image forming point side of the main light beams in a case of performing pupil division with the light sensing element) for forming pupil-divided subject light in the phase difference detection pixel is set to become distant from a position of the image forming point of the main light beams according to a variation in the image height. Thereby, it is possible to improve characteristics of the phase difference detection pixels in the same manner as the embodiments of the present disclosure. In addition, in a case where two light sensing elements are provided in a phase difference detection pixel and subject light is pupil-divided (for example, refer to Japanese Unexamined Patent Application Publication No. 2010-237401) as well, a position of the end portion of the light sensing element on the image forming point side of the main light beams is set to become distant from a position of the image forming point of the main light beams according to a variation in the image height, and thereby it is possible to improve characteristics of the phase difference detection pixels in the same manner as the embodiments of the present disclosure.

In addition, although the embodiments of the present disclosure have been described assuming that the color filters provided in the image generation pixels are color filters of three primary colors (RGB), the present disclosure is not limited thereto. For example, the embodiments of the present disclosure may be also similarly applied to a case where complementary color filters are provided in the image generation pixels. In addition, the embodiments of the present disclosure may also be similarly applied to a case where pixels (for example, an imaging device where a blue pixel, a green pixel, and a red pixel are repeatedly arranged in the optical axis direction) which detect all the light beams of wavelengths in a visible range in one pixel region are the image generation pixels.

Further, although the description has been made assuming that the color filter of the phase difference detection pixel is a W filter, the present disclosure is not limited thereto, and if a transparent layer is present instead of the filter, characteristics of the phase difference detection pixel can also be improved in a case where a G filter is provided instead of the W filter, or the like.

Although, in the embodiments of the present disclosure, an example where an image generated by the second signal processing unit 170 is displayed as a live view image has been described, the present disclosure is not limited thereto, and a generated image may be preserved as a moving image.

The embodiments of the present disclosure represent an example for embodying the present disclosure, and as is clearly described in the embodiments of the present disclosure, the matters in the embodiments of the present disclosure respectively have correspondence relationships with matters which specify the present disclosure in the claims. Similarly, the matters which specify the present disclosure in the claims respectively have correspondence relationships with the matters in the embodiments of the present disclosure, which have the same names. However, the present disclosure is not limited to the embodiments, and may be embodied through various modifications of the embodiments in the scope not departing from the spirit of the present disclosure.

The process procedures described in the embodiments of the present disclosure may be grasped as a method including a series of procedures, and may be grasped as a program for enabling a computer to execute a series of procedures or a recording medium storing the program thereon. As the recording medium, for example, a CD (Compact Disc), an MD (Mini Disc), a DVD (Digital Versatile Disc), a memory card, a Blu-ray Disc (registered trademark), or the like may be used.

In addition, the present disclosure may employ the following configurations.

(1) An imaging device include a micro lens that collects light from a subject; a light sensing element that generates a signal for performing focusing determination through phase difference detection by sensing subject light collected by the micro lens; and a light blocking portion that is disposed between the micro lens and the light sensing element and performs pupil division for the subject light by blocking a part of the subject light, wherein the light blocking portion is set such that a position of an image forming point of subject light passing through the micro lens and a position of an end portion of the light blocking portion on an entrance side become distant from each other according to a variation in image height.

(2) The imaging device set forth in (1), wherein a micro lens, a light sensing element, and a light blocking portion constitute a phase difference detection pixel, and two phase difference detection pixels adjacent or close to each other are used as a pair of phase difference detection pixels for performing the phase difference detection, wherein in relation to a centroid position in an exit pupil of light sensed by one phase difference detection pixel of the pair of phase difference detection pixels, positions from a center of the exit pupil in the one phase difference detection pixel are substantially the same position regardless of image height, and wherein in relation to a centroid position in an exit pupil of light sensed by the other phase difference detection pixel of the pair of phase difference detection pixels, positions from a center of the exit pupil in the other phase difference detection pixel are substantially the same position regardless of image height.

(3) The imaging device set forth in (1) or (2), wherein the light blocking portion is set such that a position of the image forming point and a position of the end portion become distant from each other according to an increase in the image height.

(4) The imaging device set forth in (3), wherein a micro lens, a light sensing element, and a light blocking portion constitute a phase difference detection pixel, and two phase difference detection pixels adjacent or close to each other are used as a pair of phase difference detection pixels for performing the phase difference detection, wherein the light blocking portion of one phase difference detection pixel of the pair of phase difference detection pixels is set such that a position of the image forming point in the one phase difference detection pixel and a position of the end portion of the light blocking portion on the entrance side in the one phase difference detection pixel become distant from each other in one direction of the pupil division directions of the pair of phase difference detection pixels according to an increase in the image height, and wherein the light blocking portion of the other phase difference detection pixel of the pair of phase difference detection pixels is set such that a position of the image forming point in the other phase difference detection pixel and a position of the end portion of the light blocking portion on the entrance side in the other phase difference detection pixel become distant from each other in the other direction of the pupil division directions of the pair of phase difference detection pixels according to an increase in the image height.

(5) The imaging device set forth in (1) or (2), wherein the light blocking portion is set such that a position of the image forming point and a position of the end portion become close to each other according to an increase in the image height.

(6) The imaging device set forth in (5), wherein a micro lens, a light sensing element, and a light blocking portion constitute a phase difference detection pixel, and two phase difference detection pixels adjacent or close to each other are used as a pair of phase difference detection pixels for performing the phase difference detection, wherein the light blocking portion of one phase difference detection pixel of the pair of phase difference detection pixels is set such that a position of the image forming point in the one phase difference detection pixel and a position of the end portion of the light blocking portion on the entrance side in the one phase difference detection pixel become close to each other in one direction of the pupil division directions of the pair of phase difference detection pixels according to an increase in the image height, and wherein the light blocking portion of the other phase difference detection pixel of the pair of phase difference detection pixels is set such that a position of the image forming point in the other phase difference detection pixel and a position of the end portion of the light blocking portion on the entrance side in the other phase difference detection pixel become close to each other in the other direction of the pupil division directions of the pair of phase difference detection pixels according to an increase in the image height.

(7) The imaging device set forth in any one of (1) to (6), wherein the light blocking portion is set such that a predetermined position of the image height is used as a reference position, and a position of the image forming point and a position of the end portion correspond with each other at the reference position, and is set such that the position of the image forming point and the position of the end portion become distant from each other according to a variation in the image height from the reference position.

(8) The imaging device set forth in any one of (1) to (7), wherein a micro lens, a light sensing element, and a light blocking portion constitute a phase difference detection pixel, and two phase difference detection pixels adjacent or close to each other are used as a pair of phase difference detection pixels for performing the phase difference detection, and wherein the distance between a position of the image forming point and a position of the end portion of the light blocking portion on the entrance side in one phase difference detection pixel of the pair of phase difference detection pixels is substantially the same as the distance between a position of the image forming point and a position of the end portion of the light blocking portion on the entrance side in the other phase difference detection pixel of the pair of phase difference detection pixels.

(9) The imaging device set forth in any one of (1) to (8), wherein an image forming point of subject light passing through the micro lens is an image forming point of the main light beams passing through the micro lens.

(10) An imaging device include a micro lens that collects light from a subject; and a light sensing element that generates a signal for performing focusing determination through phase difference detection by sensing subject light collected by the micro lens, wherein the light sensing element is set such that a position of an image forming point of subject light passing through the micro lens and a position of an end portion of the light sensing element on the image forming point side become distant from each other according to a variation in image height.

(11) An imaging apparatus includes an imaging device including a micro lens that collects light from a subject, a light sensing element that generates a signal for performing focusing determination through phase difference detection by sensing subject light collected by the micro lens, and a light blocking portion that is disposed between the micro lens and the light sensing element and performs pupil division for the subject light by blocking a part of the subject light, wherein the light blocking portion is set such that a position of an image forming point of subject light passing through the micro lens and a position of an end portion of the light blocking portion on an entrance side become distant from each other according to a variation in image height; a focusing determination unit that performs focusing determination through phase difference detection based on a signal generated by a phase difference detection pixel; and an image generation unit that generates an image based on a signal generated by an image generation pixel.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
   a micro lens that collects light from a subject;
   a light sensing element that generates a signal for performing focus determination through phase difference detection by sensing the collected light; and
   a light blocking portion that is disposed between the micro lens and the light sensing element, wherein the light blocking portion performs pupil division for the collected light by blocking a portion of the collected light, wherein the light blocking portion is set such that a position of an image forming point of the light passing through the micro lens, and a position of an end portion of the light blocking portion on an entrance side are aligned with each other, and wherein the position of the image forming point and the end portion of the light blocking portion become distant from each other according to a variation in image height.

2. The imaging device according to claim 1, wherein a micro lens, a light sensing element, and a light blocking portion constitute a phase difference detection pixel, and two phase difference detection pixels adjacent or close to each other are used as a pair of phase difference detection pixels for performing the phase difference detection,
   wherein a centroid position in an exit pupil of light sensed by one phase difference detection pixel of the pair of phase difference detection pixels, and positions from a center of the exit pupil in the one phase difference detection pixel are substantially the same position regardless of image height, and
   wherein a centroid position in an exit pupil of light sensed by the other phase difference detection pixel of the pair of phase difference detection pixels, and positions from a center of the exit pupil in the other phase difference detection pixel are substantially the same position regardless of image height.

3. The imaging device according to claim 1, wherein the light blocking portion is set such that the position of the image forming point and the position of the end portion become distant from each other according to an increase in the image height.

4. The imaging device according to claim 3, wherein the micro lens, the light sensing element, and the light blocking portion constitute a phase difference detection pixel, and two phase difference detection pixels adjacent or close to each other are used as a pair of phase difference detection pixels for performing the phase difference detection,
   wherein the light blocking portion of one phase difference detection pixel of the pair of phase difference detection pixels is set such that a position of the image forming point in the one phase difference detection pixel and the position of the end portion of the light blocking portion on the entrance side in the one phase difference detection pixel become distant from each other in one direction of the pupil division directions of the pair of phase difference detection pixels according to an increase in the image height, and
   wherein the light blocking portion of the other phase difference detection pixel of the pair of phase difference detection pixels is set such that a position of the image forming point in the other phase difference detection pixel and the position of the end portion of the light blocking portion on the entrance side in the other phase difference detection pixel become distant from each other in the other direction of the pupil division directions of the pair of phase difference detection pixels according to an increase in the image height.

5. The imaging device according to claim 1, wherein the light blocking portion is set such that a position of the image forming point and a position of the end portion become close to each other according to an increase in the image height.

6. The imaging device according to claim 5, wherein a micro lens, a light sensing element, and a light blocking portion constitute a phase difference detection pixel, and two phase difference detection pixels adjacent or close to each other are used as a pair of phase difference detection pixels for performing the phase difference detection, wherein the light blocking portion of one phase difference detection pixel of the pair of phase difference detection pixels is set such that a position of the image forming point in the one phase difference detection pixel and a position of the end portion of the light blocking portion on the entrance side in the one phase difference detection pixel become close to each other in one direction of the pupil division directions of the pair of phase difference detection pixels according to an increase in image height, and wherein the light blocking portion of the other phase difference detection pixel of the pair of phase difference detection pixels is set such that a position of the image forming point in the other phase difference detection pixel and a position of the end portion of the light blocking portion on the entrance side in the other phase difference detection pixel become close to each other in the other direction of the pupil division directions of the pair of phase difference detection pixels according to an increase in the image height.

7. The imaging device according to claim 1, wherein the light blocking portion is set such that a predetermined position of the image height is used as a reference position, and a position of the image forming point and a position of the end portion correspond with each other at the reference position, and is set such that the position of the image forming point and the position of the end portion become distant from each other according to a variation in the image height from the reference position.

8. The imaging device according to claim 1, wherein the micro lens, the light sensing element, and the light blocking portion constitute a phase difference detection pixel, and two phase difference detection pixels adjacent or close to each other are used as a pair of phase difference detection pixels for performing the phase difference detection, and wherein a distance between a position of the image forming point and the position of the end portion of the light blocking portion on the entrance side in one phase difference detection pixel of the pair of phase difference detection pixels is same as a distance between a position of the image forming point and the position of the end portion of the light blocking portion on the entrance side in the other phase difference detection pixel of the pair of phase difference detection pixels.

9. The imaging device according to claim 1, wherein the image forming point of the light passing through the micro lens is an image forming point of light beams from the subject passing through the micro lens.

10. An imaging device comprising:
a micro lens that collects light from a subject; and
a light sensing element that generates a signal for performing focus determination through phase difference detection by sensing the collected light,
wherein the light sensing element is set such that a position of an image forming point of the light passing through the micro lens and a position of an end portion of the light sensing element on the image forming point side are aligned with each other, and wherein the position of the image forming point and the end portion of the light sensing element become distant from each other according to a variation in image height.

11. An imaging apparatus comprising:
an imaging device comprising:
a micro lens that collects light from a subject,
a light sensing element that generates a signal for performing focus determination through phase difference detection by sensing the collected light,
and a light blocking portion that is disposed between the micro lens and the light sensing element, wherein the light blocking portion performs pupil division for the subject light by blocking a portion of the collected light,
wherein the light blocking portion is set such that a position of an image forming point of subject light passing through the micro lens and a position of an end portion of the light blocking portion on an entrance side are aligned with each other and become distant from each other according to a variation in image height;
and a focusing determination unit that performs the focus determination through phase difference detection based on the signal generated by a phase difference detection pixel.

12. The imaging device according to claim 1, further comprising a filter disposed between the micro lens and the light blocking portion, wherein the filter transmits light of a visible light range.

13. The imaging device according to claim 1, wherein the position of the image forming point of the light passing through the micro lens and the position of the end portion of the light blocking portion are aligned with each other when the light is parallel to an optical axis of the light sensing element.

14. The imaging device according to claim 1, wherein the light sensing element is a photodiode.

15. The imaging device according to claim 1, wherein the light sensing element senses the light through an aperture which is not blocked by the light blocking portion.

16. The imaging apparatus according to claim 11, wherein the light blocking portion is set such that the position of the image forming point and the position of the end portion become distant from each other according to an increase in the image height.

17. The imaging apparatus according to claim 11, wherein the micro lens, the light sensing element, and the light blocking portion constitute a phase difference detection pixel, and two phase difference detection pixels adjacent or close to each other are used as a pair of phase difference detection pixels for performing the phase difference detection, wherein the light blocking portion of one phase difference detection pixel of the pair of phase difference detection pixels is set such that a position of the image forming point in the one phase difference detection pixel and the position of the end portion of the light blocking portion on the entrance side in the one phase difference detection pixel become distant from each other in one direction of the pupil division directions of the pair of phase difference detection pixels according to an increase in the image height, and wherein the light blocking portion of the other phase difference detection pixel of the pair of phase difference detection pixels is set such that a position of the image forming point in the other phase difference detection pixel and the position of the end portion of the light blocking portion on the entrance side in the other phase difference detection pixel become distant from each other in the other direction of the pupil division directions of the pair of phase difference detection pixels according to an increase in the image height.

18. The imaging apparatus according to claim 11, further comprising a filter disposed between the micro lens and the light blocking portion.

19. The imaging apparatus according to claim 18, wherein the filter transmits light of a visible light range.

20. The imaging apparatus according to claim 11, wherein the light sensing element is a photodiode.

21. The imaging apparatus according to claim 11, wherein the light sensing element senses the subject light through an aperture which is not blocked by the light blocking portion.

\* \* \* \* \*